(12) United States Patent
Cooper

(10) Patent No.: US 6,710,778 B2
(45) Date of Patent: Mar. 23, 2004

(54) METHOD FOR HALFTONING USING A DIFFERENCE WEIGHTING FUNCTION

(75) Inventor: Brian Edward Cooper, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 338 days.

(21) Appl. No.: 09/781,843

(22) Filed: Feb. 12, 2001

(65) Prior Publication Data

US 2002/0163528 A1 Nov. 7, 2002

(51) Int. Cl.$^7$ .............. G09G 3/36; G09G 5/00; G09G 5/02; G06K 15/00
(52) U.S. Cl. ............ 345/596; 345/586; 345/643; 345/89; 358/3.03; 358/3.04; 358/3.17
(58) Field of Search .................. 345/418–419, 345/426–428, 581, 586, 587, 589, 590–591, 596–599, 606–610, 612, 613, 614, 615, 616, 617, 618–620, 643, 639, 644, 673, 690, 692, 693–696, 89, 698; 358/1.8, 1.9, 534–536, 1.1, 302, 3.01, 3.03, 3.04–3.06, 3.09, 3.1, 3.13–3.16, 3.17–3.19, 500–502, 517–522; 382/254, 276, 168–170, 220, 225; 348/254, 256

(56) References Cited

U.S. PATENT DOCUMENTS

| | | | |
|---|---|---|---|
| 5,214,517 A | * 5/1993 | Sullivan et al. | ............ 358/3.19 |
| 5,317,418 A | * 5/1994 | Lin | ............ 358/3.19 |
| 5,677,093 A | 10/1997 | Delabastita et al. | |
| 5,696,602 A | * 12/1997 | Cooper et al. | ............ 382/254 |

(List continued on next page.)

OTHER PUBLICATIONS

Robert Ulichney, "The void–and–cluster method for dither array generation", vol. 1913, Aug. 1994.*
Daniel L. Lau et al., "Journal of the Optical Society of America A," Digital Halftoning Via Green Noise Masks, p. 1575–1586, (Jul. 1, 1999).

(List continued on next page.)

*Primary Examiner*—Matthew C. Bella
*Assistant Examiner*—Wesner Sajous
(74) *Attorney, Agent, or Firm*—Frederich H. Gribbell; John A. Brady

(57) ABSTRACT

An improved method of digital halftoning using "screens" or dither arrays is provided, including stochastic dither arrays (e.g., stochastic screening). The weakness of ordinary stochastic dithering is its isolated or dispersed dots and the related problems of dot gain and consistent dot formation when used with certain types of printers. However, the inconsistent formation of isolated dots causes unpredictable variations in uniformity and tone. The present invention solves this problem by grouping dots into small clusters, which may be rendered more consistently. Unlike conventional clustered-dot halftoning, however, this method arranges the dot clusters in a stochastic fashion to avoid objectionable periodic artifacts. A novel weighting function is used to generate the dot clusters, in which one function of a first extent is subtracted from another function of a second extent, thereby creating clusters of dots that center at locations where the weighting function chooses to place dots. Locations very close to an existing dot will have an increased chance of being selected; at a certain distance away from the existing dot, where the new weighting function reaches a maximum (or maxima), locations will have a smaller chance of being selected; once past this distance, the locations will have a gradually increasing chance of selection.

22 Claims, 15 Drawing Sheets

U.S. PATENT DOCUMENTS

| | | | | |
|---|---|---|---|---|
| 5,696,606 | A | * 12/1997 | Sakayama et al. | 358/468 |
| 5,745,660 | A | 4/1998 | Kolpatzik et al. | |
| 5,768,482 | A | * 6/1998 | Winter et al. | 358/1.09 |
| 5,859,955 | A | 1/1999 | Wang | |
| 5,917,951 | A | 6/1999 | Thompson et al. | |
| 6,014,500 | A | * 1/2000 | Wang | 358/1.09 |
| 6,020,978 | A | * 2/2000 | Cooper et al. | 358/1.09 |
| 6,278,802 | B1 | * 8/2001 | Delabashita et al. | 382/251 |
| 6,335,989 | B1 | * 1/2002 | Lin | 382/260 |
| 6,356,363 | B1 | * 3/2002 | Cooper et al. | 358/1.09 |
| 6,433,891 | B1 | * 8/2002 | Yu et al. | 358/1.09 |

OTHER PUBLICATIONS

Shen–Ge Wang, "1997 International Conference on Digital Printing Technologies," Stoclustic (Stochastic Clustered)) Halftone Screen Design, Xerox Corporation (Webster, New York), p. 516–521, ( Nov. 2, 1997).

Victor Ostromoukhov, "Society for Imaging Science & Technology," Pseudo–Random Halftone Screening for Color and Black and White Printing, Reiner Eschbach (Lausanne, Switzerland), p. 130–134, ( Feb. 1, 1994).

R. Ulichney, "Society for Information Display International Symposium," Filter Design for Void–and–Cluster Dither Arrays, Digital Equipment Corp. (Maynard, MA), p. 809–812, ( Jun. 1, 1994).

Robert Ulichney, "International Congress on Non–Impact Printing Technologies," Spatial Extent of Void and Cluster Finding Filters, Digital equipment Corp. (Cambridge, MA), p. 430–433, ( Oct. 29, 1995).

Qian Lin, "Society for Imaging Science and Technology," Improving Halftone Uniformity and Tonal Response, Hewlett–Packard Laboratories (Palo Alto, CA), p. 6–9, (Feb. 1, 1994).

Fredrick Nisson, "Journal of Imaging Science and Technology," Digital Halftoning using Pre–Computed Maps, Image Processing Laboratory (Linkoping, Sweden), vol. 43 ( No. 2), p. 153–159, ( Feb. 1, 1999).

John Dalton. Proceedings of the International Society for Optical Engineering Vol 2411. "Perception Of Binary Texture and the Generation of Stochastic Halftone Screens". SPIE Journal. USA. pp. 207–220. Feb. 6–8, 1995.

* cited by examiner

GAUSSIAN(3) — GAUSSIAN(1)

GAUSSIAN(2) – GAUSSIAN(1)

NON-ISOTROPIC GAUSSIAN(4,1) − (0.5, 0.5)

GAUSSIAN(1.5, 3.0) − GAUSSIAN(0.5, 1.0)

TANH(1.5) − TANH(1.0)

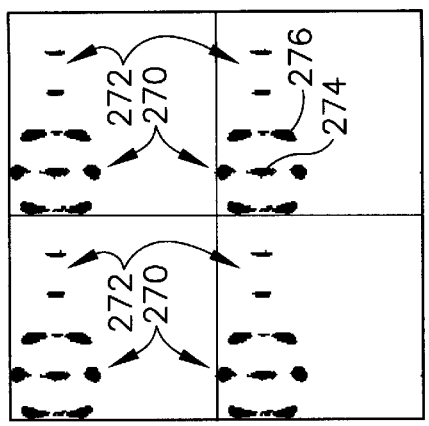
FIG. 22 GAUSS 20-35
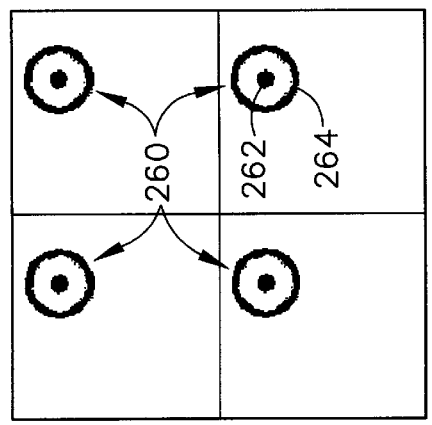
FIG. 21 GAUSS 15-25
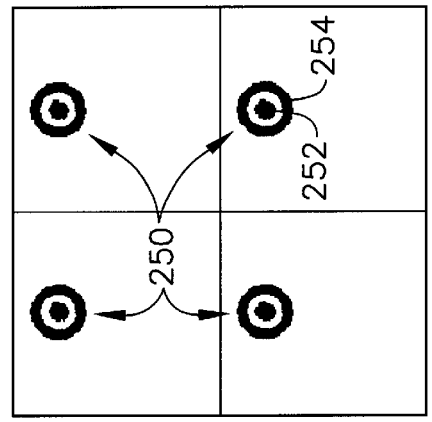
FIG. 20 GAUSS 10-20
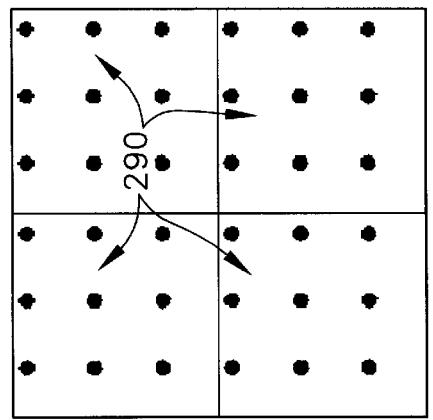
FIG. 24 GAUSS 30-40
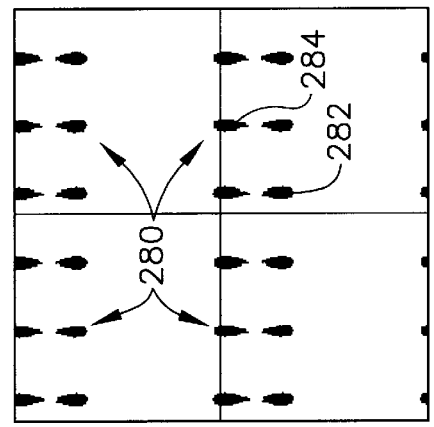
FIG. 23 GAUSS 25-35

METHOD FOR HALFTONING USING A DIFFERENCE WEIGHTING FUNCTION

TECHNICAL FIELD

The present invention relates generally to halftoning of input image data and is particularly directed to generating a stochastic dither array of the type which generates clusters of dots. The invention is specifically disclosed as a method for generating clustered dots using an "overall" weighting function derived from two functions of two different extents which are subtracted from one another, so that small clusters of dots are formed at locations near a center of the overall weighting function, but at a predetermined radius from this center the overall weighting function limits the chance of such locations from being selected.

BACKGROUND OF THE INVENTION

Halftoning describes the algorithmic process of displaying an image on a device that is capable of representing only a finite, discrete number of tone levels. The position and arrangement of the discrete picture elements should create the illusion of a continuous-tone image (see, Ulichney, "Digital Halftoning," MIT Press (1987)). Traditional halftoning techniques include clustered-dot ordered dithering, dispersed-dot ordered dithering, and error diffusion.

More recent halftoning techniques include a method using dispersed-dot unordered dithering, which is also known as stochastic dithering, which combines the speed of a dither array with a quality approaching that of error diffusion. Examples of stochastic dithering include: Sullivan and Ray's Correlated Minimum Visual Modulation Patterns (see U.S. Pat. No. 5,214,517), and Sullivan, Ray, and Miller's, "Design of Minimum Visual Modulation Halftone Patterns," published by IEEE Transactions on Systems, Man and Cybernetics, Volume 21, No. 1, pages 33–38 (January/February 1991)); Parker and Mitsa's Blue Noise Mask (see U.S. Pat. No. 5,111,310); Mitsa and Parker, "Digital Halftoning Technique Using a Blue-Noise Mask," published in J. Opt. Soc. Am., Volume 9, No. 11, pages 1920–1929 (November 1992)); Ulichney's Void and Cluster Algorithm (see U.S. Pat. No. 5,535,020); Ulichney, "The Void-and-Cluster Method for Dither Array Generation," Proceedings of the SPIE, Volume 1913, pages 332–343 (September 1993)); and Cooper, Knight, and Love's Minimum Density Variance Method (see U.S. Pat. No. 5,696,606).

Although stochastic dithering performs well in many circumstances, it has certain limitations related to the physical printing process. Similar to conventional error diffusion, stochastic dithering requires reliable reproduction of dispersed dots. However, printers often have difficulty rendering individual, dispersed dots consistently (especially laser or other electrophotographic printers). This causes variation in uniformity and tone. On the other hand, clustered dots, as opposed to dispersed dots, may be rendered with much greater consistency. It could be a significant advantage for certain physical printers to use a hybrid version of halftoning that uses clustered-dot, unordered dithering.

Some clustered-dot unordered (stochastic) dithering methods are beginning to appear. Ostromoukhov may have the earliest such approach, based upon Voronoi polygons. See Ostromoukhov, "Pseudo-Random Halftone Screening for Color and Black and White Printing," published in Recent Progress in Digital Halftoning, edited by Eschbach, pages 130–134 (1994)—originally in Proceedings of IS&T's 9$^{th}$ Non-Impact Printing Conference held on Oct. 4–8, 1993.

More recently, Lau has extended the green noise halftoning approach to generate dither arrays (see Lau, Arce, and Gallagher, "Digital Halftoning Via Green Noise Masks," to appear in J. Opt. Soc. Am. A, 1999). Lau et al. have filed corresponding patent applications in the United States, see application Ser. Nos. 60/071,649 (filed Jan. 16, 1998) and 09/228,573 (filed Jan. 11, 1999).

Two other documents of interest regarding blue noise dither matrices are, "Methods for Generating Blue-Noise Dither Matrices for Digital Halftoning," by Spaulding, Miller, and Schildkraut, J. of Electronic Imaging, Volume 6, No. 2, pages 208–230 (April 1997); and Wang and Parker, "Properties of Jointly-Blue Noise Masks and Application on Color Halftoning," Proceedings of IS&T/SID Seventh Color Imaging Conference, pages 188–193 (November 1999).

Another interesting patent application is WO 99/45697 (by Nilsson), which discloses the use of a band-pass filter to modify the mid-tones of the gray levels used in halftoning an image. FIGS. 5 and 7 disclose some interesting maps used for halftoning.

A conventional void and cluster algorithm begins with an arbitrary dot pattern, typically consisting of a random arrangement of dots. These dots are then repositioned iteratively until the dots are properly dispersed. This becomes the initial dot pattern. A dither array is now constructed, and dots are removed sequentially from the dot pattern. Each time a dot is removed, its location is marked in the dither array with the appropriate threshold level. Once all dots have been removed, the initial dot pattern is restored. Dots are now added sequentially, while marking the corresponding location in the dither array with the appropriate threshold level.

To disperse the original dot pattern, the largest void (i.e., concentration of non-dots, or "holes") and the largest cluster (i.e., concentration of dots) are identified. (It should be noted that, in the context of a void and cluster algorithm, a "cluster" is a concentration of dots—the dots need not be physically adjacent.) The pixels at these two locations are swapped, in which the dot located at the largest cluster is moved to the location of the largest void. This process continues iteratively until the swap will turn the largest void into the largest cluster, and vice versa. The result is a dot pattern with the same number of dots as the initial pattern, but with the dots spread out from one another (i.e., dispersed) in a visually pleasing manner.

The process of constructing a threshold array from the initial dot pattern is similar. Dots are removed from the locations forming the largest clusters, and dots are added to the locations forming the largest voids. To locate the largest void and the largest cluster, a simple two-dimensional Gaussian weighting function is used. This weighting function is shifted so that its peak is centered at the location of a dot. (It should be noted that the weighting function, like the threshold array, must be periodic.) For each dot in the image, a shifted weighting function will be accumulated. The smallest and largest values, respectively, determine the void and cluster of the given dot pattern.

The largest void may not necessarily be located at a hole, nor must the largest cluster be located at a dot. For example, suppose that the binary image consists of only four (4) dots, arranged in a cross with a hole in the center. The largest cluster would be located at the center of the cross, which of course means that the cluster is not located at a dot. Obviously, a dot cannot be added to a location which already contains a dot, nor may a dot be removed from a location that is already empty.

As described above, the void and cluster algorithm uses a Gaussian weighting function to determine the location at which each dot should be added or removed. This will yield a dither array—potentially a stochastic dither array—consisting of dispersed dots. However, it is possible to modify the weighting function so that a stochastic dither array of clustered dots is instead formed.

It would be an advantage to provide a new method for generating a clustered-dot, stochastic dither array, in the context of a void and cluster algorithm, understanding that this concept can be applied equally well to other existing stochastic dither array algorithms, such as the minimum density variance method.

SUMMARY OF THE INVENTION

Accordingly, it is an advantage of the present invention to provide a void and cluster-type algorithm that uses a novel weighting function that yields a dither array of clustered dots.

It is another advantage of the present invention to provide a weighting function that will create a stochastic dither array of clustered dots, rather than creating dispersed dots.

It is another advantage of the present invention to provide a methodology by which a pair of functions, in which the extent of one function is larger than the other, is used to generate a weighting function used for halftoning.

It is yet another advantage of the present invention to provide a weighting function that creates clusters of dots in which the weighting function reaches a minima at a center, then, as the distance from the center increases, the function increases and reaches a maximum or maxima, and thereafter the function decreases as the distance from the center further increases.

It is a further advantage of the present invention to provide a weighting function that uses two Gaussian functions, or two hyperbolic tangent functions, or a mixture of these functions, or two other types of functions that exhibit a maximizing and a minimizing effect when one such function is subtracted from the other.

It is yet a further advantage of the present invention to provide a weighting function that creates clusters when used with a minimum density variance methodology of creating a dither array, in which the cost function is the difference between two density sum arrays, or the difference between two delta density sum arrays.

It is still a further advantage of the present invention to provide a method for creating a clustered-dot dither array which rotates the clusters by an angle to either produce a special effect, or to be more readily discernible by the human visual system.

It is still another advantage of the present invention to create a clustered-dot dither array that creates a non-circular profile, such as an ellipse.

It is yet another advantage of the present invention to filter everything but shapes that are not orthogonal, which would eliminate a step of rotating the cluster in some circumstances.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for halftoning is provided for use with a computer system, in which the method comprises: (a) providing a first function of a first extent and a second function of a second extent, wherein the first extent is not equal to the second extent, and subtracting the second function from the first function to thereby derive a weighting function; and (b) halftoning input data using the weighting function to create at least one dot cluster, wherein, at each dot cluster, the weighting function reaches at least one first minima at substantially a center position, then increases to at least one maximum along a path directed away from the center position, and finally decreases toward at least one second minima further along the path.

In accordance with another aspect of the present invention, a method for halftoning is provided for use with a computer system, in which the method comprises: (a) providing a first minimization function and a second maximization function, wherein the first and second functions are not equal to one another, and subtracting the second function from the first function to thereby derive a weighting function; and (b) halftoning input data using the weighting function to create at least one dot cluster, wherein, at each dot cluster, the weighting function reaches at least one first minima at substantially a center position, then increases to at least one maximum along a path directed away from the center position, and finally decreases toward at least one second minima further along the path.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIGS. 20–24 disclose various Gaussian difference weighting functions, in which the maximizing function is greater in magnitude (or extent) than the minimizing function.

DETAILED DESCRIPTION OF THE PREFERRED EMBODIMENT

Figure 1:
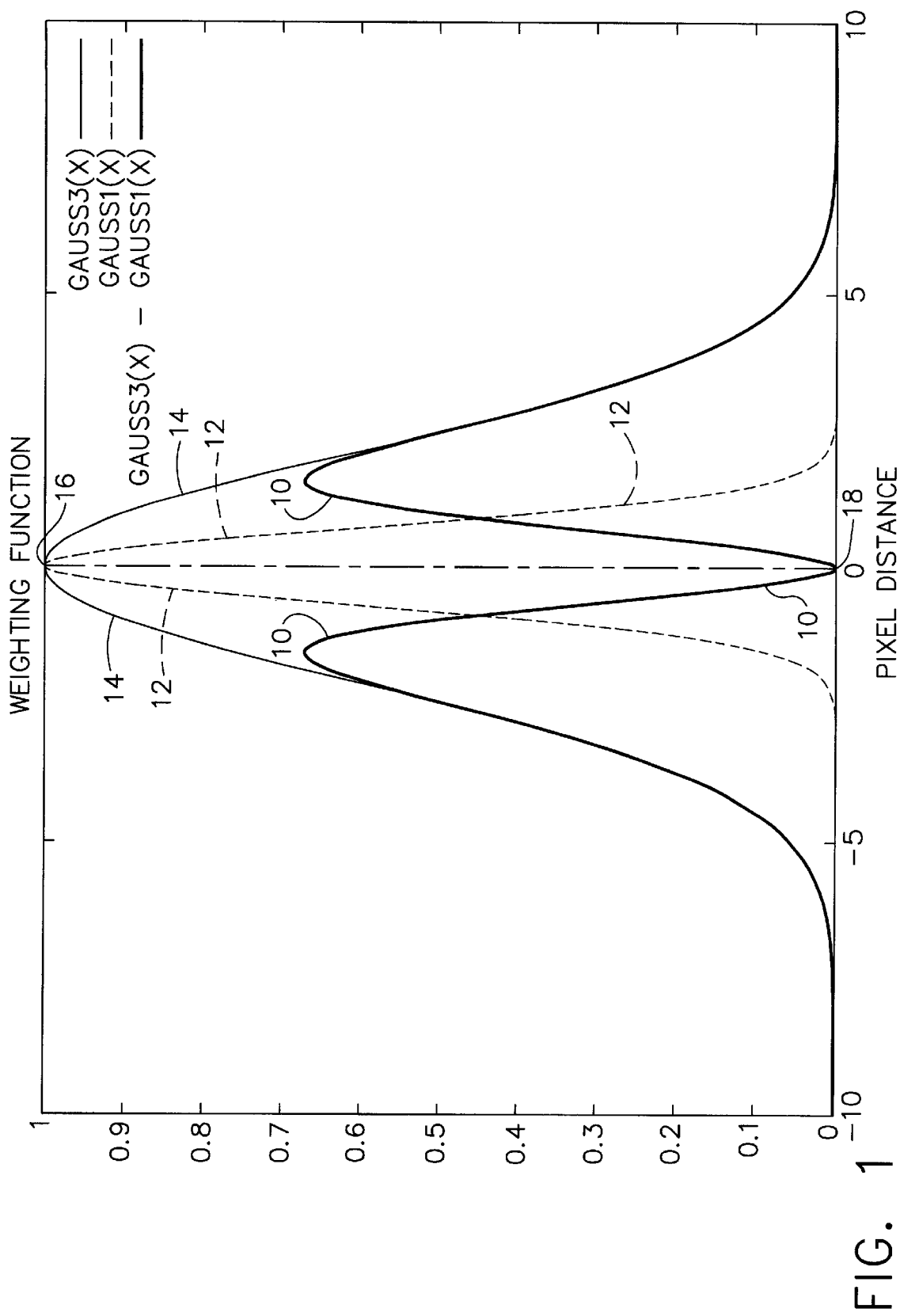
FIG. 1 is a graph of the spatial domain describing a novel weighting function used in creating clusters of dots for halftoning, as according to the principles of the present invention.

Reference will now be made in detail to the present preferred embodiment of the invention, an example of which is illustrated in the accompanying drawings, wherein like numerals indicate the same elements throughout the views.

The present invention relates to digital halftoning with "screens" or dither arrays. More specifically, it relates to stochastic dither arrays (e.g., stochastic screening). The weakness of ordinary stochastic dithering is its isolated or dispersed dots and the related problems of dot gain and consistent dot formation when used with certain types of printers. Dot gain, to the extent that it is predictable, may be accommodated by calibrating the halftone screen. However, the inconsistent formation of isolated dots causes unpredictable variations in uniformity and tone. The present invention solves this problem by grouping dots into small clusters, which may be rendered more consistently. Unlike conventional clustered-dot halftoning, however, this method arranges the dot clusters in a stochastic fashion to avoid objectionable periodic artifacts.

In the present invention, a pair of functions is used to create a new weighting function, in which the extent of one function is larger than the other. For Gaussian functions, the sigma ($\sigma$) parameter of one function is larger than the other. The function having the smaller extent is subtracted from the function having the larger extent. As an example, if G($\sigma$) refers to a Gaussian function of the parameter sigma ($\sigma$), if the first function has a sigma of 3, and the second function has a sigma of 1, then the new weighting function is G(3)–G(1). It should be noted that the Gaussian parameter mu ($\mu$) is set to zero (0) for the examples described herein.

Using this novel weighting function, a minimum is reached at the center. The weighting function increases as the distance from the center increases, reaches a maximum (or set of maxima) at some point(s), and then decreases again. In contrast, an ordinary weighting function used with conventional void and cluster algorithms has a maximum at the center and decreases as the distance from the center increases.

The shape of the new weighting function allows for clusters of dots to form. Locations very close to an existing dot will have an increased chance of being selected. At a certain distance away from the existing dot, where the new weighting function reaches a maximum (or maxima), locations will have a smaller chance of being selected. Once past this distance, the locations will have a gradually increasing chance of selection, similar to the behavior of a conventional void and cluster algorithm's weighting function.

While an isotropic weighting function could be used in many situations, a non-isotropic weighting function may be desirable in certain physical printers, or for other circumstances. This would particularly allow for the non-isotropic sensitivity of the human visual system to be incorporated. A non-isotropic weighting function would also allow for the creation of non-circular dots, which might be more robust on a given printing mechanism.

In the spatial domain, the weighting function that subtracts two Gaussian functions of different extents will form a "volcano-type" shape having a center crater, in which the top of the volcano's "rim" is relatively circular and also relatively smooth, if the weighting function is isotropic. On the other hand, a non-isotropic weighting function using two Gaussian functions of different extents could provide a volcanic-mountain "crater" shape in which the shape of the "rim" is not particularly smooth, but instead changes elevations at certain places, and can even have an appearance of four (4) "peaks" at the four "corners" of the crater's rim. Another variation using Gaussian functions of different extents would be to have a non-isotropic function in which the crater's "rim" is symmetric across one axis at a time, thereby providing elliptical-shaped rims, which could be very useful for a laser printer.

Instead of using Gaussian functions, a hyperbolic tangent function could be instead used, in which two hyperbolic tangent functions of different extents are subtracted from one another. One such weighting function in the spatial domain could provide another volcano-type shape having a relatively circular "rim" with a hollow "crater" in the center, although the rim would not be particularly smooth. Of course, when using hyperbolic tangent functions, the overall function could again be non-isotropic.

As noted above, the present invention applies to algorithms beyond merely the void and cluster algorithm. For example, the minimum density variance methodology could be used in which the cost function consists of the difference between two density sum arrays. Alternatively, for greater efficiency the cost function could consist of the difference between two delta density sum arrays. These concepts are discussed in great detail in U.S. Pat. No. 5,696,602, assigned to Lexmark International, Inc., which is hereby incorporated by reference in its entirety.

As a further alternative, interlocked clustered stochastic dither arrays could be used for color halftoning situations, or for interlocking more than one threshold (dither) array used in a single color plane. Interlocked clustered stochastic dither arrays are described in greater detail in U.S. Pat. No. 6,020,978, which is assigned to Lexmark International, Inc., which is herein incorporated by reference in its entirety, as well as U.S. patent application Ser. No. 09/494,192 (filed on Jan. 31, 2000), also assigned to Lexmark International, Inc., and which is also hereby incorporated by reference in its entirety.

Referring now to FIG. 1, a novel weighting function used in the present invention is illustrated in the spatial domain, and is generally designated by the reference numeral 10. This weighting function 10 is comprised of the difference between two Gaussian functions, in which the sigma (σ) value of the Gaussian functions is three (3) for the larger extent function, and the sigma (σ) value for the other Gaussian function is equal to one (1), for the smaller extent function. These two Gaussian functions having a particular σ value are normalized so that they have a maximum value at or near the same point (see the point 16), so that when these two Gaussian functions are subtracted from one another, the difference yields a minima at the point 18 on FIG. 1.

The Gaussian function in which the σ value is equal to gauss(3(x)) is the curve designated by the reference numeral 14. The Gaussian weighting function having a σ value of gauss(1(x)) is generally designated by the reference numeral 12. The subtraction of these two (2) Gaussian functions yields the weighting function 10 used in the present invention.

Figure 2:
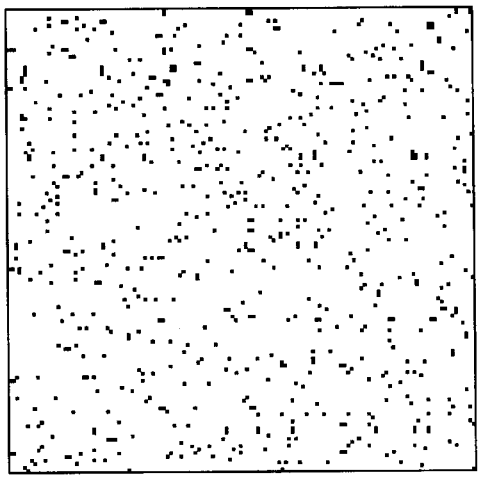
FIG. 2 illustrates a dot pattern of white noise that acts as the initial pattern before dispersion or clustering of dots.
Figure 3:
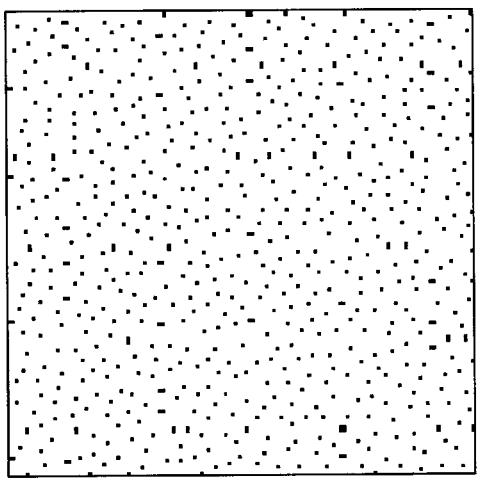
FIG. 3 illustrates the dispersion of dots using a minimum cost function of simulated annealing (or the minimum density variance method of halftoning).
Figure 4:
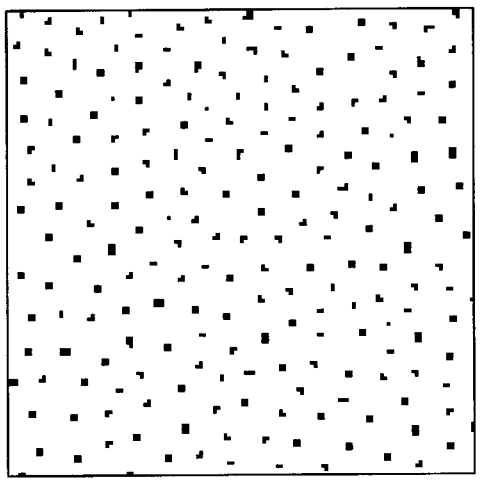
FIG. 4 illustrates clusters of dots that are formed according to a min/max cost function, as according to the present invention.

FIGS. 2–4 illustrate an example of using the present invention to create clusters of dots. FIG. 2 illustrates a white noise initial pattern of dots at 20, and if simulated annealing is used as per the minimum density variance method noted above in which the dots are dispersed according to a minimum cost function, the dispersal of these dots has the appearance as shown at 22 in FIG. 3.

When the clustering algorithm of the present invention is used, it can be considered a combination of a "minimum cost" and a "maximum cost" of dispersing the dots. As described above, it is an advantage to form clusters of dots for certain visual effects, or for use with certain physical printing mechanisms. The illustration of the dots at 24 on FIG. 4 shows the result of using the clustering algorithm of the present invention for a single level of a dot profile, which can be used for building a threshold array.

Figure 5:
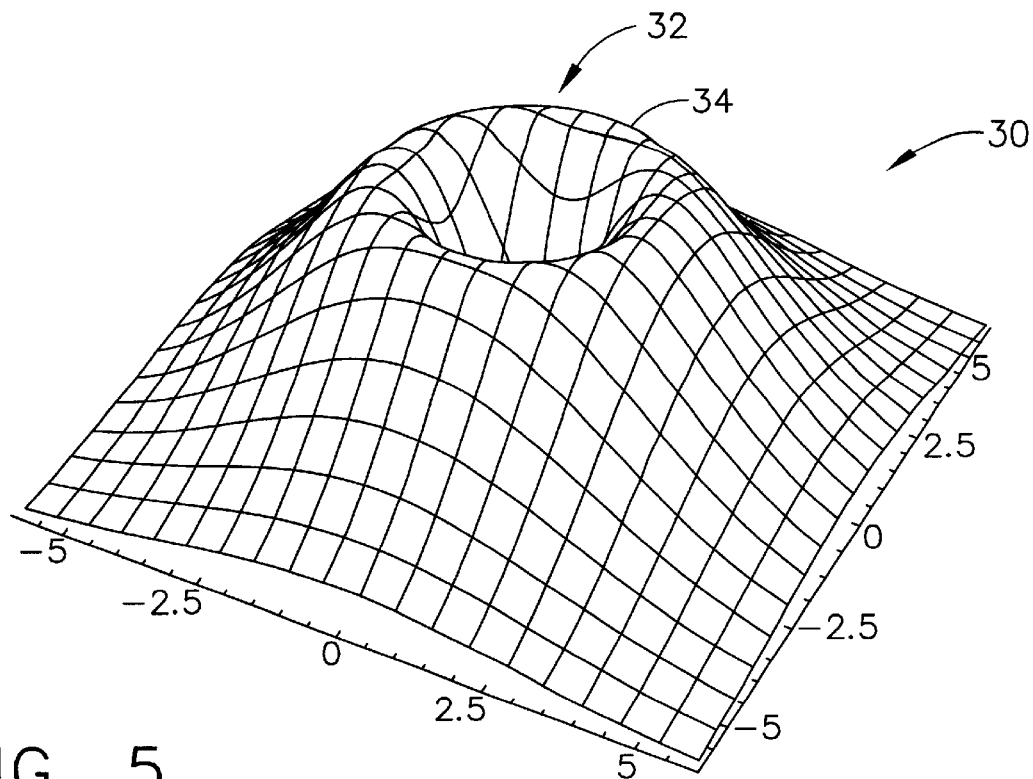
FIGS. 5 and 6 disclose a three-dimensional map of a weighting function in the spatial domain for Gaussian(3)–Gaussian(1) functions.
Figure 6:
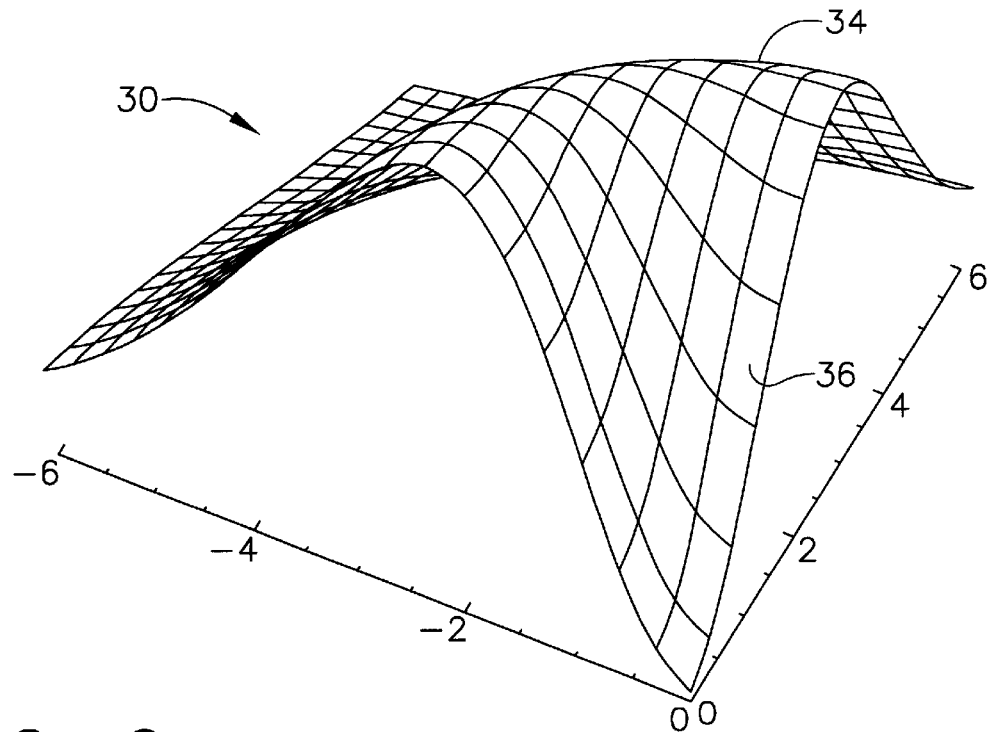

FIGS. 5 and 6 provide an example in three-dimensions as to the appearance in the spatial domain of the weighting function using two Gaussian functions of different extents. FIG. 5 shows a weighting function 30 of the present invention which has a "volcanic rim" at 34, and a "volcanic crater" at 32. This particular weighting function represents the difference between a Gaussian function of σ=3, minus a Gaussian function of σ=1.

FIG. 6 is a magnified view of a portion of this same weighting function 30, showing details of the 3-D shape of the curve as it approaches its minima near the center of the "crater" 32. As can be seen at the region 36 on FIG. 6, the shape of the three-dimensional curve is such that it touches or nearly reaches the (0,0) origin in this view, which means that it has a minima at that center point.

Figure 7:
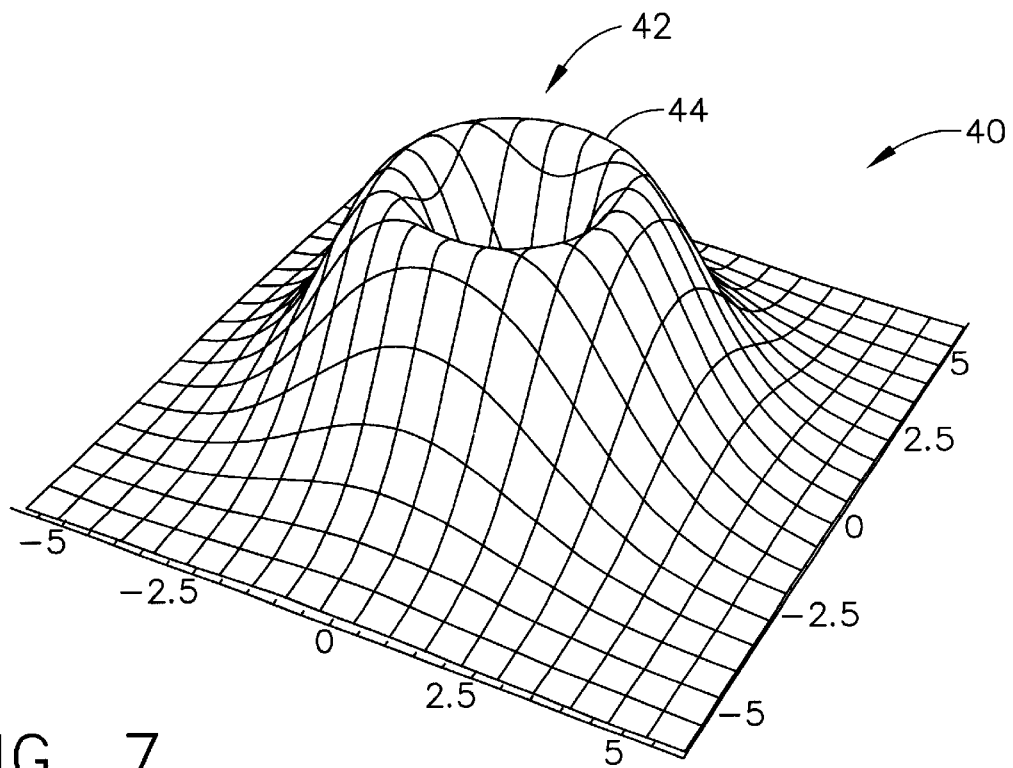
FIGS. 7 and 8 disclose a three-dimensional map of a weighting function in the spatial domain for Gaussian(2)–Gaussian(1) functions.
Figure 8:
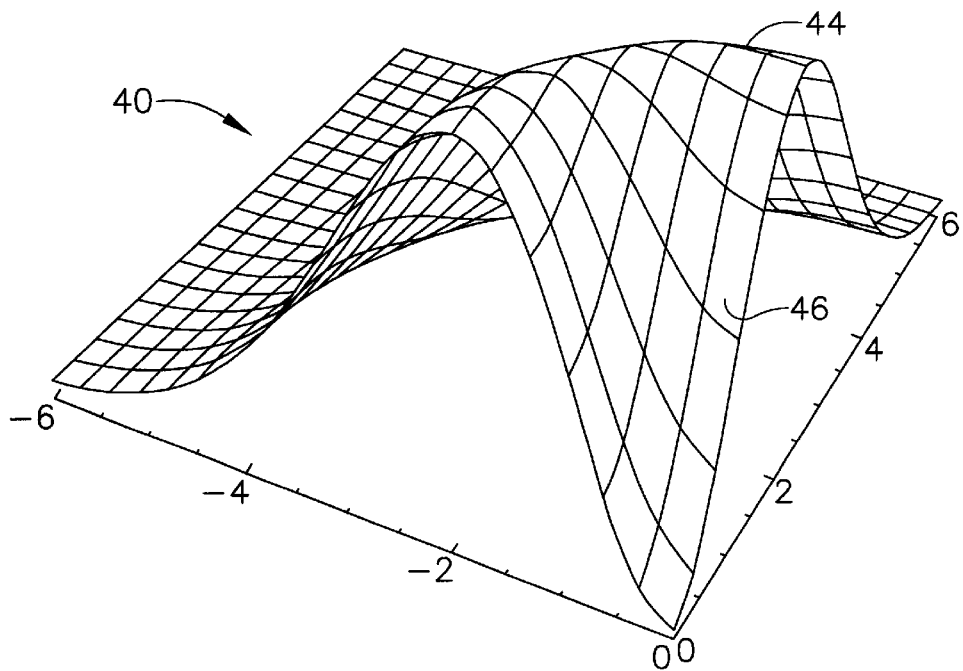

FIGS. 7 and 8 show a similar weighting function in which the Gaussian σ values are different from the curve illustrated in FIGS. 5 and 6. In FIG. 7, the curve in three dimensions is generally designated by the reference numeral 40. Its "volcanic rim" 44 and "volcanic crater" 42 are easily seen in FIG. 7. In FIG. 8, the shape of the three-dimensional curve in the portion at 46 is illustrated in a magnified view, and clearly shows that the curve achieves or nearly reaches a zero value at the origin of the axes at (0,0), which is the center of the crater 42.

The 3-D curve 40 in FIGS. 7 and 8 is made up of a difference between two Gaussian functions, in which the larger extent Gaussian function has a σ value of two (2), and the smaller extent Gaussian function has a σ value of one (1).

Figure 9:
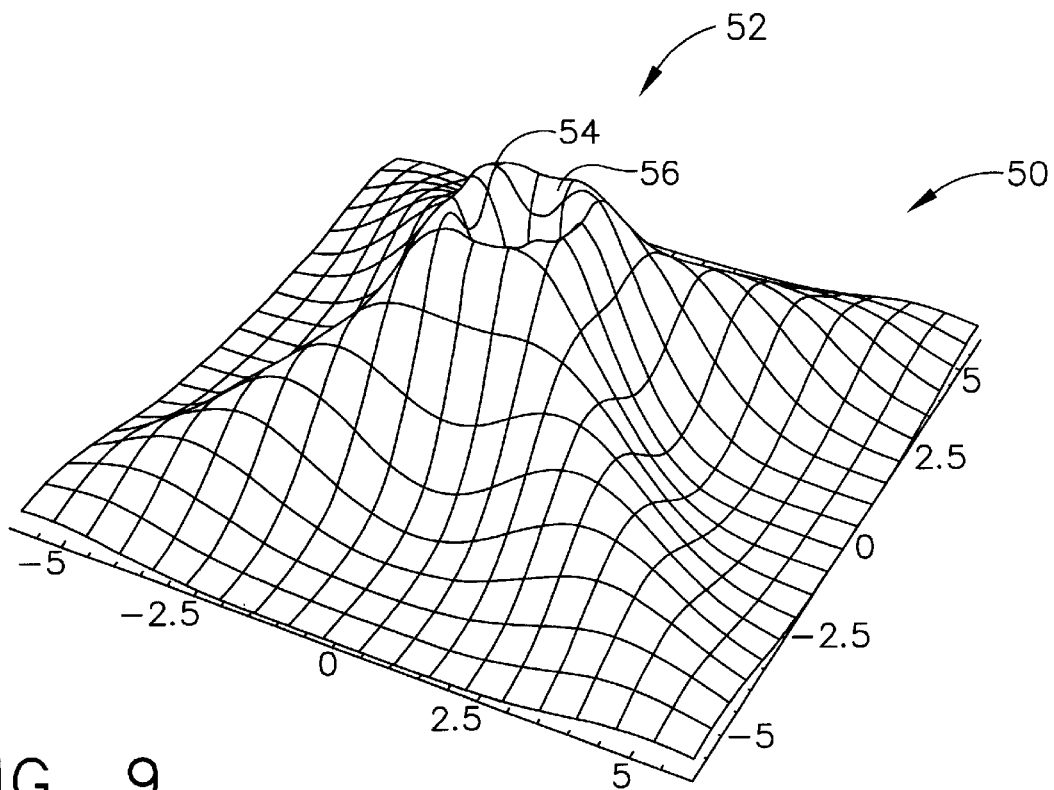
FIGS. 9 and 10 illustrate a map of a weighting function in the spatial domain for a non-isotropic function of Gaussian (4,1)–Gaussian(0.5,0.5).
Figure 10:
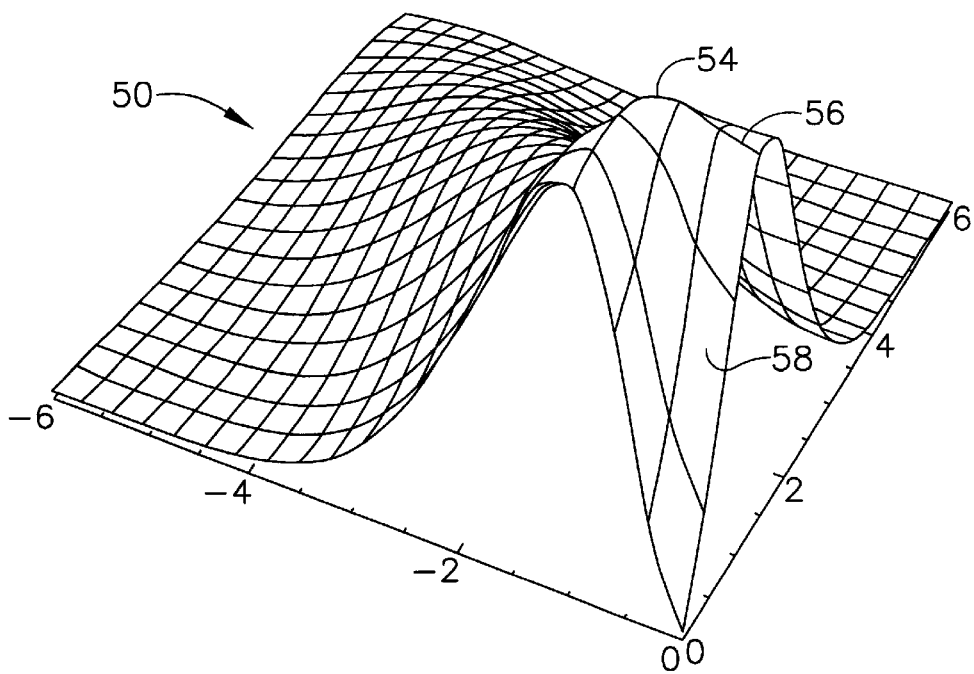

FIGS. 9 and 10 show a different weighting function in the spatial domain, in which non-isotropic Gaussian functions are used. The general form of the non-isotropic Gaussian weighting function is provided in EQUATION #1, which is discussed in greater detail below. With reference to FIGS. 9 and 10, the three-dimensional curve at 50 is a non-isotropic weighting function, which has a "volcanic rim" illustrated at 54 and 56, and a "volcanic crater" at 52. In this particular situation, the volcanic "rim" has four (4) "corners" or "peaks" that tend to be greater in extent than remaining portions of the "rim." These four (4) peaks occur at 54, while the lesser height portions of the "rim" are illustrated at 56. This can be seen more clearly in the magnified view of FIG. 10.

FIG. 10 illustrates a cross section of the curve 50 from FIG. 9, and clearly shows the shape of the curve within the crater area 52, particularly at the portion 58 that slopes down to a zero or near-zero value at the origin point (0,0) of the axes used in this graph. Again, the "peak" values around the "rim" are illustrated at 54.

In FIGS. 9 and 10, the weighting function uses two Gaussian functions, in which the larger extent Gaussian function has sigma values $\sigma_x$, $\sigma_y$ having values of (4,1), while the lesser extent Gaussian function has sigma values $\sigma_x$, $\sigma_y$ of (0.5,0.5). This curve is more tailored to the human visual system, since it tends to form clusters in a diagonal direction. It will be understood that the eye is less sensitive in diagonal directions as compared to vertical and horizontal directions.

As noted above, the general form of the equation used to create the curve in FIGS. 9 and 10 is provided in EQUATION #1. This same equation is also used to generate the curve 60 illustrated in FIGS. 11 and 12, although in this case the Gaussian non-isotropic functions use different σ values. The three-dimensional curve has a "volcanic crater" at 62, with a "volcanic rim" at 64 and 66. The points making up the largest values of the "rim" are illustrated at 64, while the points making up the lowest values of the "rim" are illustrated at 66.

Figure 12:
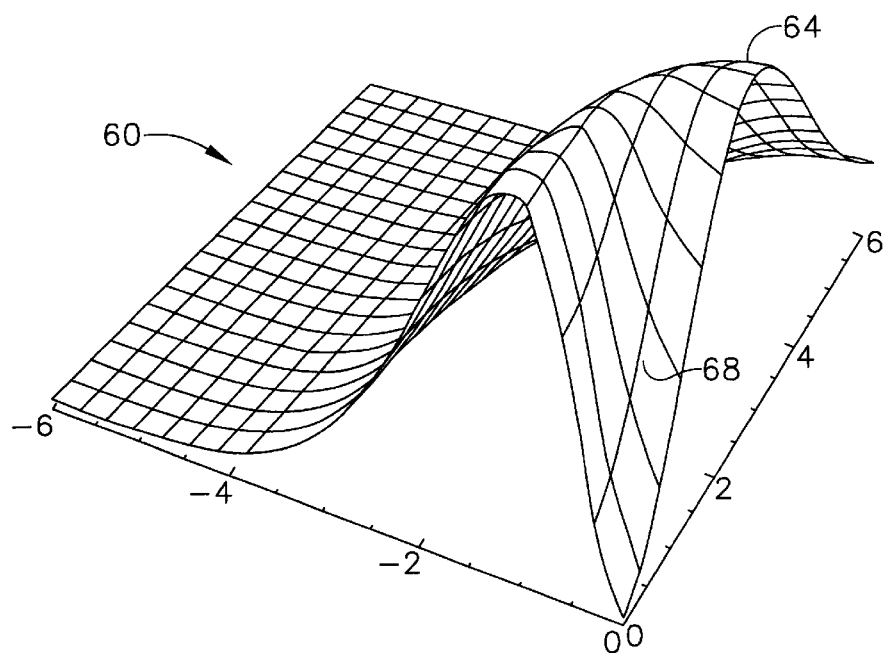

FIG. 12 shows a cut-away magnified view of a portion of the curve 60, in which the portion 68 is clearly illustrated as reaching down to or near the zero value at the origin (0,0).

Figure 11:
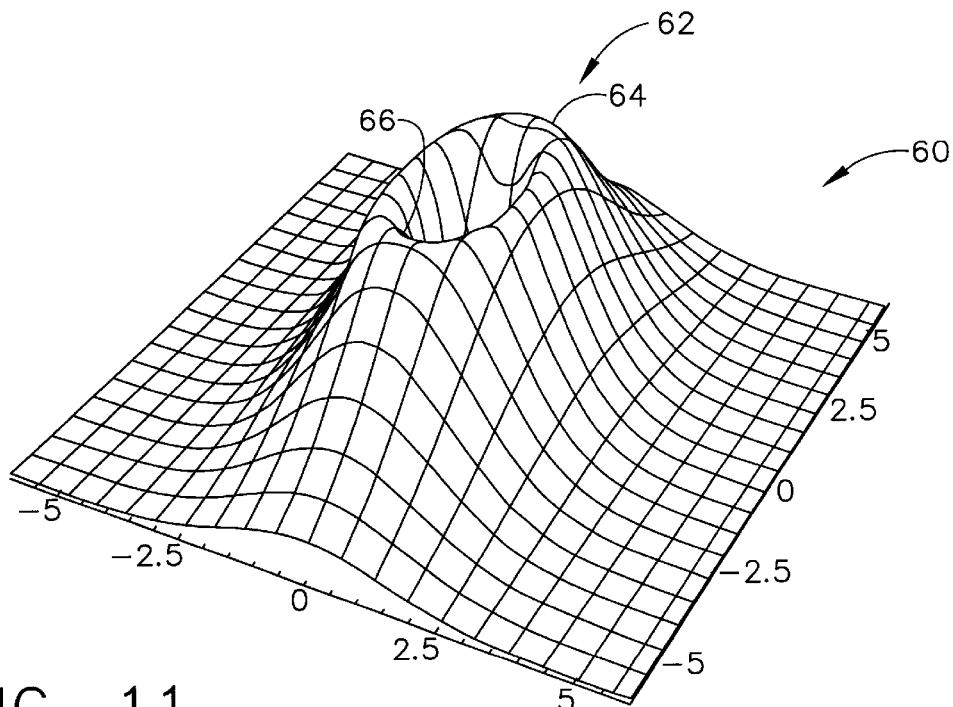
FIGS. 11 and 12 illustrate a map of a weighting function in the spatial domain for a non-isotropic function of Gaussian(1.5,3.0)–Gaussian(0.5,1.0).

In FIGS. 11 and 12, the Gaussian function having the larger extent has sigma values of $\sigma_x=1.5$ and $\sigma_y=3.0$, while the lesser extent Gaussian function has sigma values of $\sigma_x=0.5$ and $\sigma_y=1.0$. In this curve 60, the function is non-isotropic, however the function is symmetric across one axis at a time. The overall effect is elliptical, in which the long axis of the ellipse intersects the larger values at the "rim" at 64, while the lesser elliptical axis intersects the minimum values of the "rim" at 66. This type of shape could be very useful for laser printers.

Figure 13:
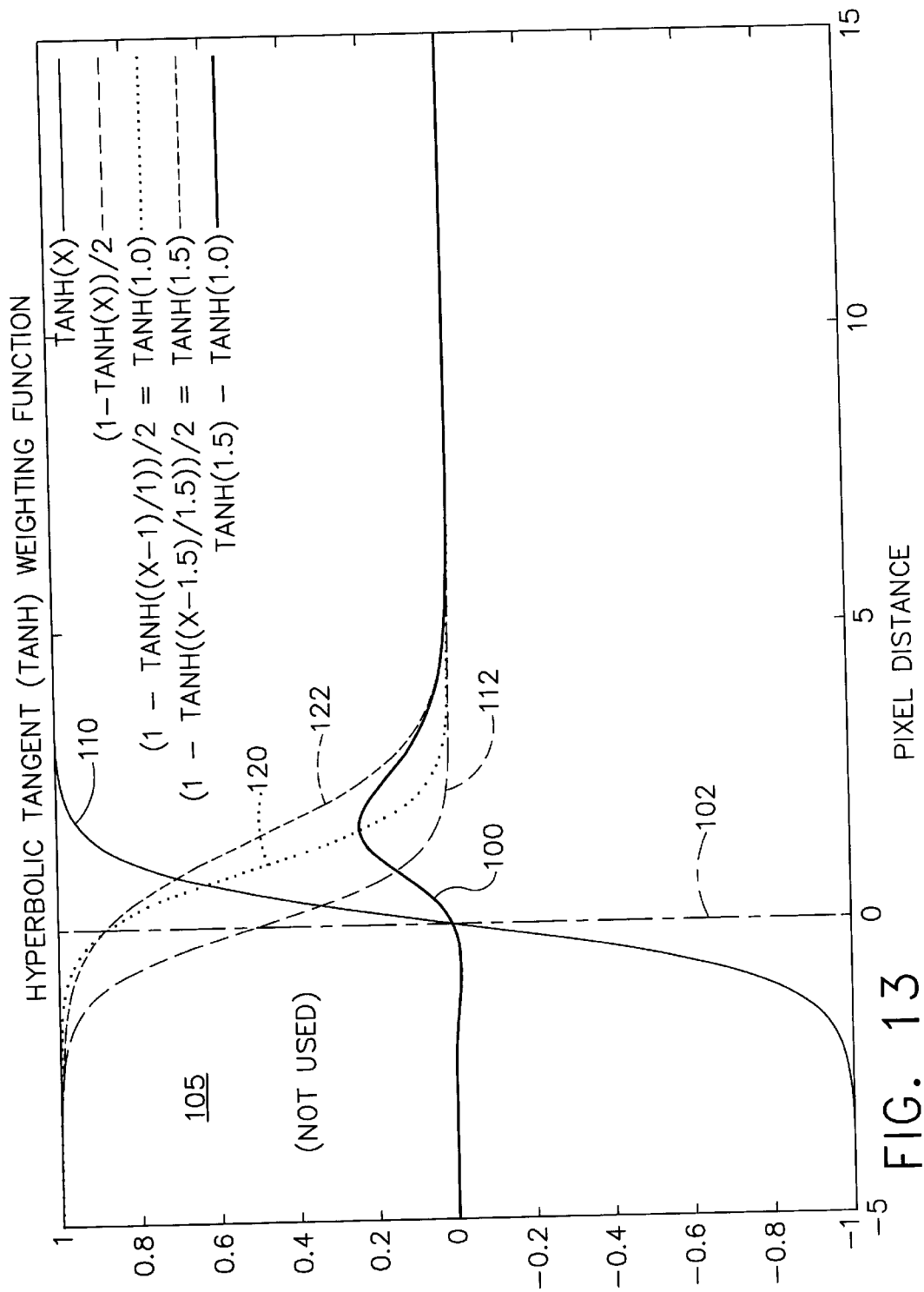
FIG. 13 is a graph of a hyperbolic tangent weighting function in the spatial domain, according to the present invention.

FIG. 13 provides graphical information on a novel weighting function useable with the present invention, as graphically described in the spatial domain. This particular weighting function uses hyperbolic tangent functions rather than Gaussian functions. The weighting function useable in the present invention is generally designated by the curve 100, which is a difference between two hyperbolic tangent functions of different extents. It will be understood that the region 105 to the left of the Y-axis 102 is not used in this weighting function. Instead, the same curves illustrated to the right of the Y-axis 102 on FIG. 13 would be duplicated in the negative X-axis region (at 105).

A normalized hyperbolic tangent function "tan h(x)" is illustrated at the curve 110. One of the curves used in generating the weighting function of the present invention is designated by the reference numeral 112, and is equal to (1−tan h(x))/2. This expression is used in creating the two different extent hyperbolic tangent functions, having a general form of: {1−tan h(x−k)/k}/2.

The larger extent hyperbolic tangent function is illustrated at the curve 122, which is also referred to as tan h(1.5). The lesser extent hyperbolic tangent function is illustrated at the curve 120, and is also referred to as tan h(1.0). The final curve 100 is equal to the expression:

tan h(1.5)−tan h(1.0).

Figure 14:
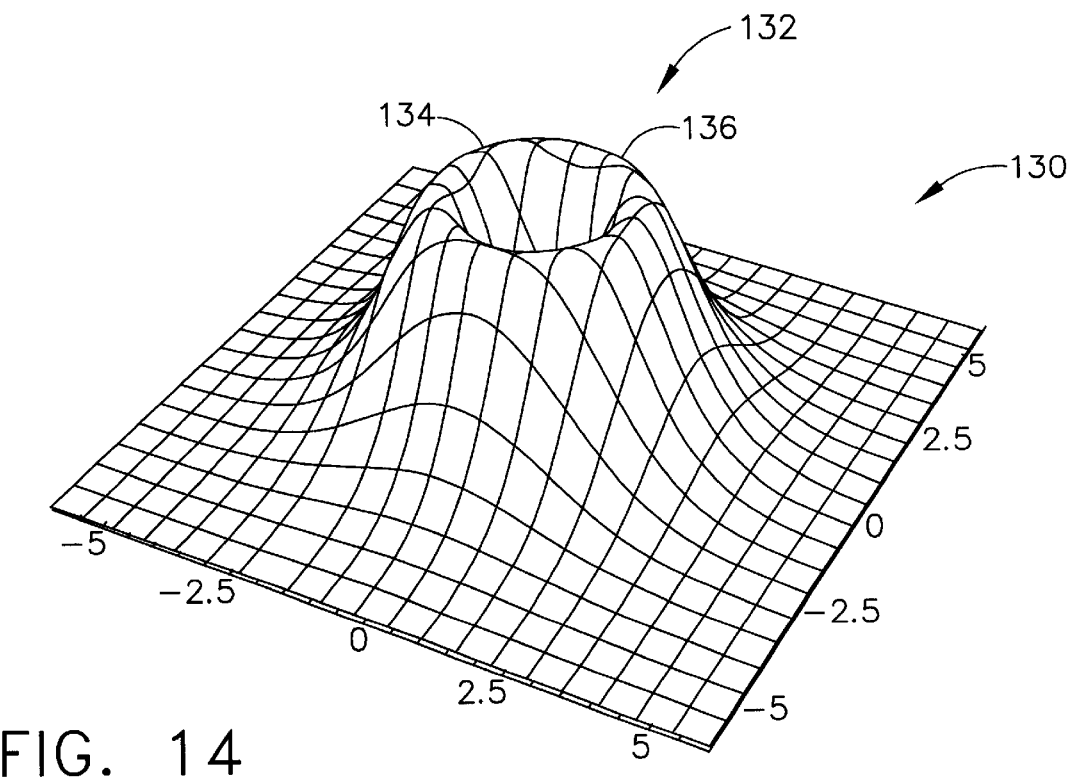
FIGS. 14 and 15 illustrate a map of a weighting function in the spatial domain for two hyperbolic tangent functions, in this case tan h(1.5)–tan h(1.0).
Figure 15:
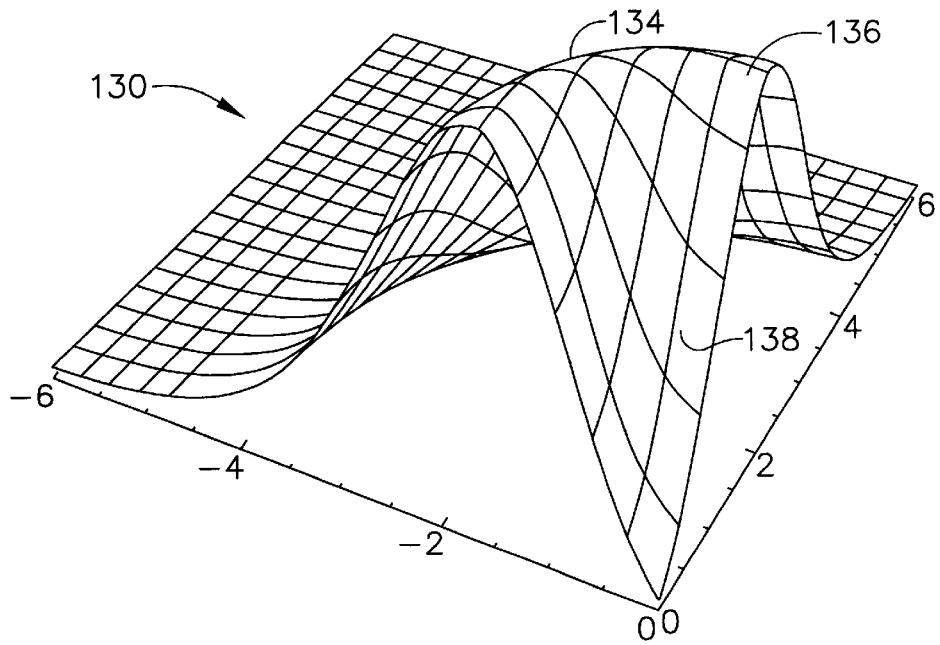

The three-dimensional shape of this curve 100 is illustrated in the spatial domain by the weighting function 130 in FIGS. 14 and 15. This weighting function produces a "volcanic rim" at 134 and 136, and a "volcanic crater" at 132. The maximum values along the rim at 134 are approximately equal across the entire circumference of the rim. A different weighting function could exhibit more pronounced peaks at 134 and valleys at 136 along the "rim."

FIG. 15 shows a cross-section view of a magnified portion of the curve 130, clearly showing some of the undulations of the "volcanic rim" at 134, and the smoother portion of the "rim" at 136. FIG. 15 also shows the surface 138 that is within the "crater" 132 that extends to a zero or near-zero value at the origin (0,0).

Figure 16:
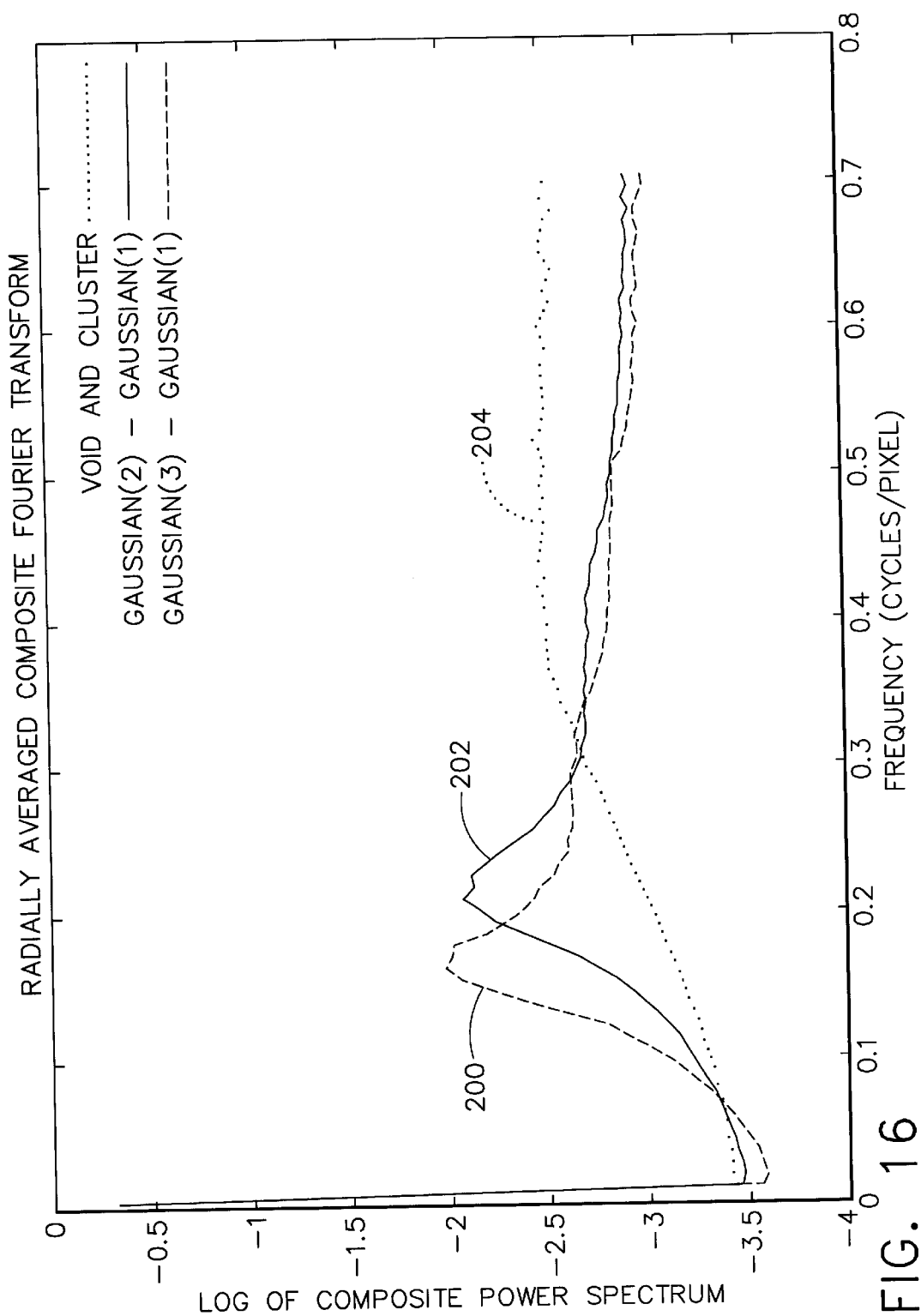
FIG. 16 is a graph illustrating a composite Fourier transform for a void and cluster algorithm, and two different Gaussian difference weighting functions, as according to the present invention.

Further information concerning the weighting functions of the present invention is provided in FIGS. 16–19, which show some Fourier transforms. In FIG. 16, a radially averaged composite Fourier transform for three different techniques is illustrated, in which the Y-axis is the logarithm of the composite power spectrum, and the X-axis is the frequency in cycles/pixel. A conventional void and cluster curve is shown at 204. This is, of course, prior art. On the other hand, curves 200 and 202 represent weighting functions used by the present invention.

The curve 200 is a composite Fourier transform of the threshold array generated by the weighting function in which two different Gaussian distributions are subtracted from one another, in this case Gaussian(3)−Gaussian(1). The curve 202 is a similar composite Fourier transform of the threshold array generated by a similar weighting function using Gaussian distributions. In the case of curve 202, the Gaussian weighting function is Gaussian(2)−Gaussian(1). These curves 200 and 202 are the composite Fourier transforms of threshold arrays that correspond to the three-dimensional graphs depicted in FIGS. 5 and 7, respectively.

In the curves of FIG. 16, the use of the word "composite" with respect to the Fourier transforms means that the entire threshold array is represented. In other words, this is an average for all gray levels of the entire threshold array. This is true for all three curves 200, 202, and 204.

Figure 17:
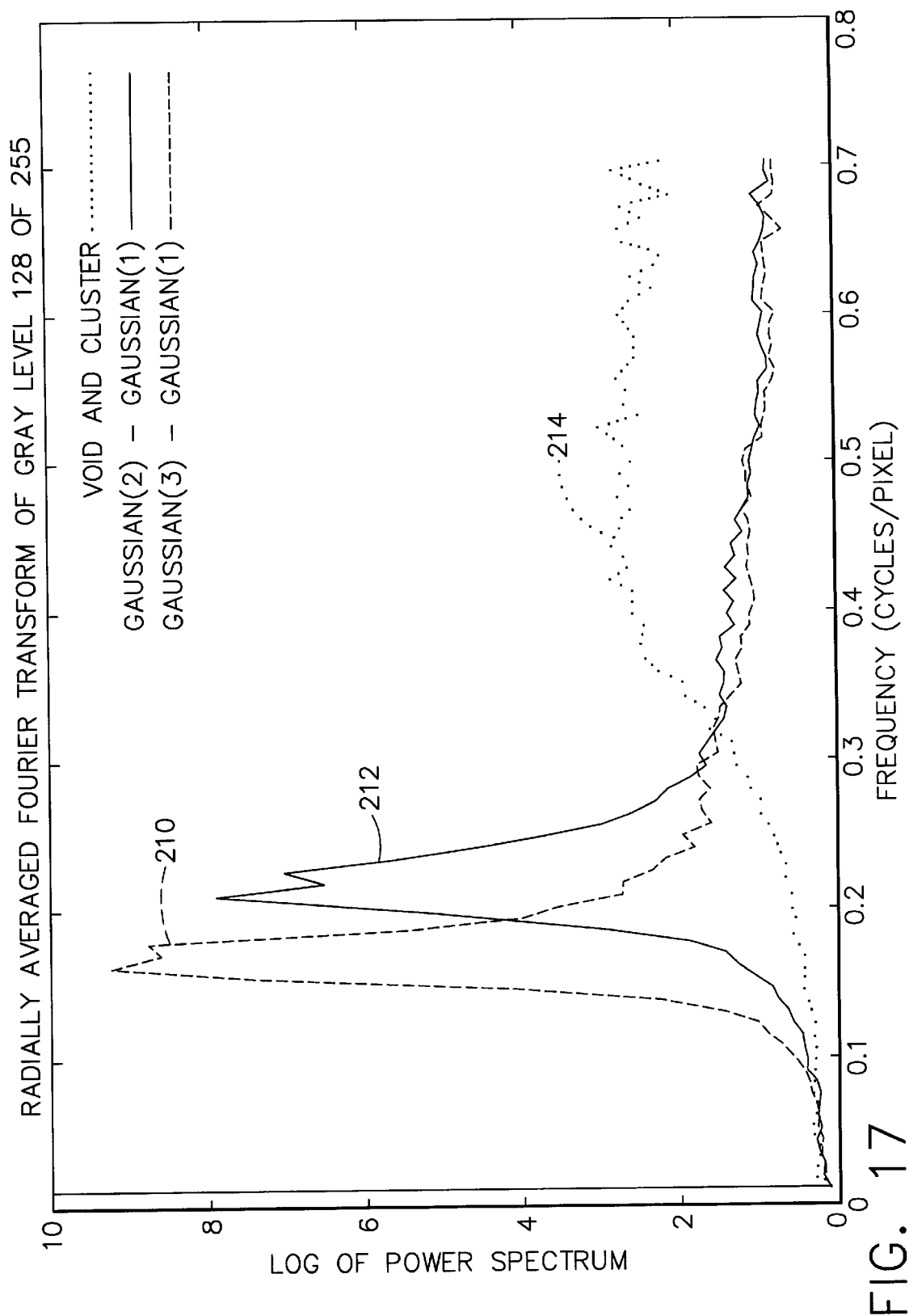
FIG. 17 is a graph of a Fourier transform for the void and cluster algorithm and two different Gaussian difference functions, for a gray level of 128 out of 255.

FIG. 17 is a similar curve of a radially averaged Fourier transform of the curves depicted in FIG. 16. In FIG. 17, however, the curves are for a single gray level, which is the gray level 128 of a total number of gray levels of 255 (using 8-bit precision). The axes are the same, although the Y-axis of the power spectrum logarithm is in a different range, as can be easily seen. The X-axis of frequency utilizes the same range as in FIG. 16.

The void and cluster curve on FIG. 17 is at 214, whereas the two Gaussian curves are at 210 and 212. The curve 210 represents the weighting function of Gaussian(3) minus Gaussian(1), whereas the curve 212 represents the weighting function of the Gaussian(2) minus Gaussian(1) function.

Figure 18:
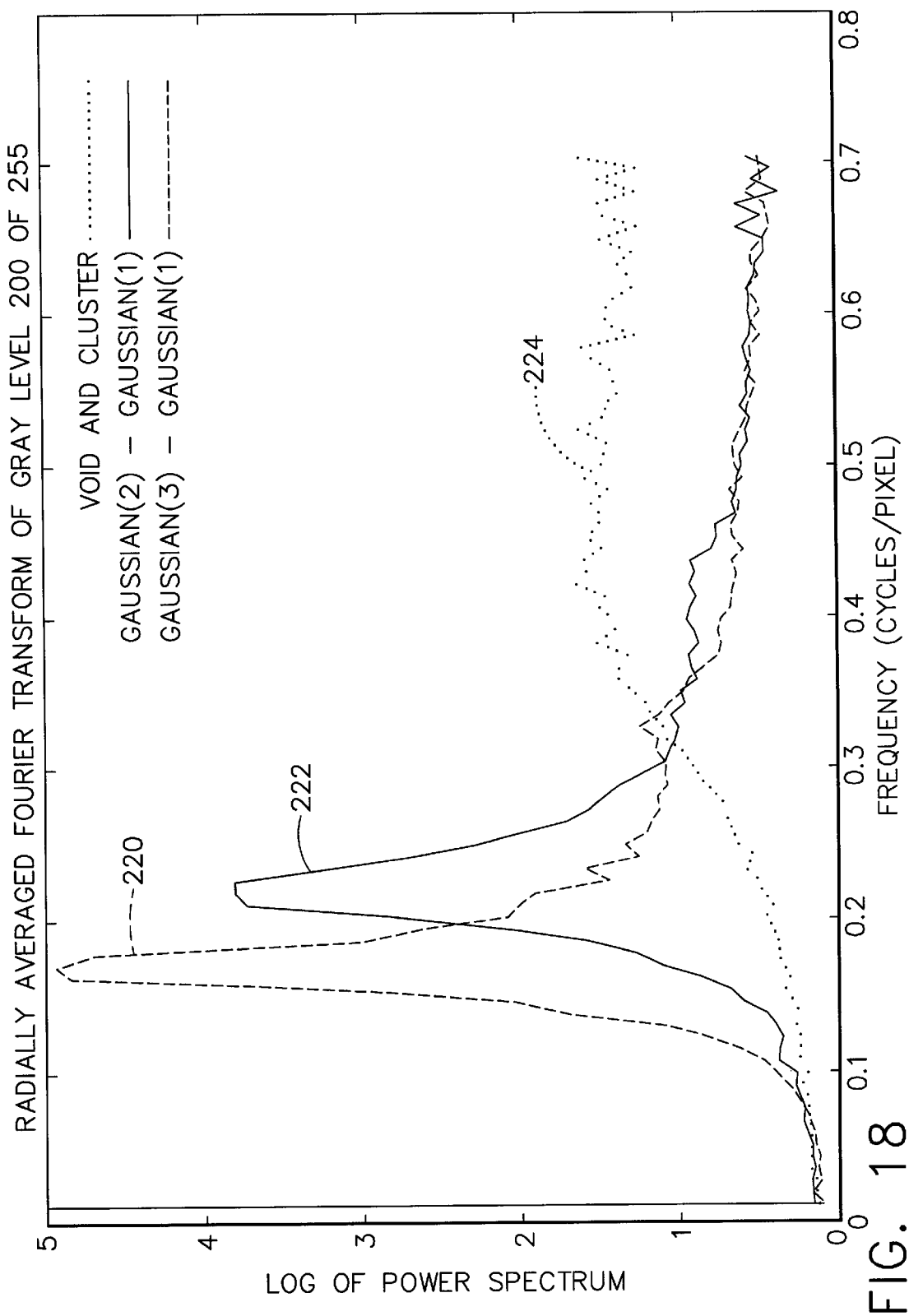
FIG. 18 is a graph of a Fourier transform for the void and cluster algorithm and two different Gaussian difference functions, for a gray level of 200 out of 255.

FIG. 18 is another curve of the radially averaged Fourier transform, this time for gray level 200 of 255. The void and cluster curve is at 224, and the two Gaussian curves are at 220 and 222. The curve 220 represents the weighting function of Gaussian(3) minus Gaussian(1), whereas the curve 222 represents the weighting function of Gaussian(2) minus Gaussian(1).

Figure 19:
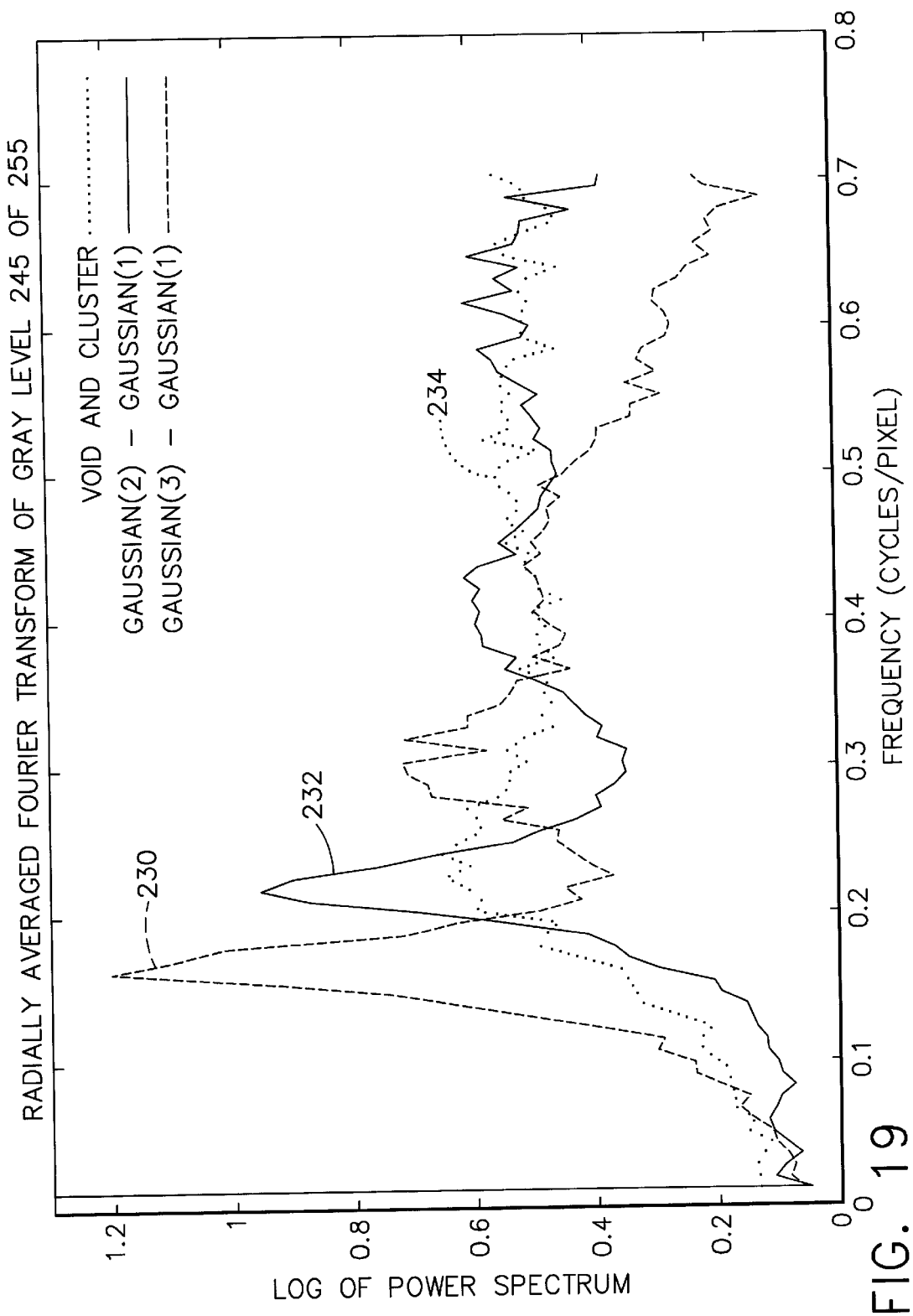
FIG. 19 is a graph of a Fourier transform for the void and cluster algorithm and two different Gaussian difference functions, for a gray level of 245 out of 255.

FIG. 19 is another radially averaged Fourier transform, this time of gray level 245 out of a maximum gray level of 255. The void and cluster curve is at 234, while the Gaussian curves are at 230 and 232. The curve 230 represents the weighting function for Gaussian(3) minus Gaussian(1), whereas the curve 232 represents the weighting function for Gaussian(2) minus Gaussian(1).

FIGS. 20–24 illustrate some shapes that result from the use of weighting functions that subtract two different Gaussian functions in which the σ values are larger in numeric value than discussed above. Furthermore, the extent of the first σ value is lower in absolute value than the extent of the second Gaussian function, which is opposite of the examples discussed above. In FIG. 20, the shapes 250 are derived by using a weighting function of Gaussian(10) minus Gaussian (20). These shapes have the appearance of a bullseye, in which the center of the shape is at 252, and the outer circle is at 254. This shape for FIG. 20 is derived from an initial binary pattern consisting of white noise at a 10% intensity. Furthermore, four (4) periods of each rearranged pattern are illustrated in the Figure.

In a similar manner, FIG. 21 shows a different type of bullseye shape at 260, which is derived from a weighting function of Gaussian(15) minus Gaussian(25). The center of the bullseye is at 262, while the circular rim is at 264.

FIG. 22 shows a less discernible "round" shape at 270 in which this shape has similarities to a bullseye, but of course is quite different as can be seen from the view. The "center" of the "bullseye" shape is at 274, while a segmented outer "circular" rim is at 276. Moreover, some extra clusters of dots appear at 272. One must keep in mind that the shapes on FIG. 22 represent four periods of each rearranged pattern. Therefore, the separate clusters of dots at 272 are not anomalies, which might appear only on one tile of the pattern. In FIG. 22, the weighting function is derived from Gaussian(20) minus Gaussian(35).

The greater the number of the σ value for the Gaussian functions, the much different shape is produced. This is apparent from FIG. 23, in which the shapes 280 appear to be sets of teardrops. A top pointing teardrop at 282 is directed toward a paired bottom-pointing teardrop 284. There are three pairs of these teardrops in each of the four (4) periods of the patterns. This pattern is generated using a weighting function of Gaussian(25) minus Gaussian(35).

The final example provided is FIG. 24, in which the clusters of dots are all virtual circles. Each of the periods of circles at 290 contains nine (9) clusters of these circles, as can be easily seen in FIG. 24. The clusters 290 were generated from a weighting function consisting of Gaussian (30) minus Gaussian(40).

It will be understood that any numeric value for σ in these Gaussian functions that make up the weighting function of the present invention could be used without departing from the principles of the present invention. Certainly other shapes could be obtained, and in testing by the inventor, other results included a single circular dot, a single elongated dot, and various noisy versions of the shapes disclosed in FIGS. 20–24. Certainly different values of the hyperbolic tangent functions would also provide different patterns of clusters of dots.

It will be also understood that mixtures of functions could be used to create the weighting function of the present invention. For example, a Gaussian function could be subtracted from a hyperbolic tangent function of different (or even the same) extent, or vice versa. The math may be more difficult when attempting such a mixed function for the weighting function; however, it nevertheless could be accomplished, and as such is contemplated as part of the present invention.

Figure 25:
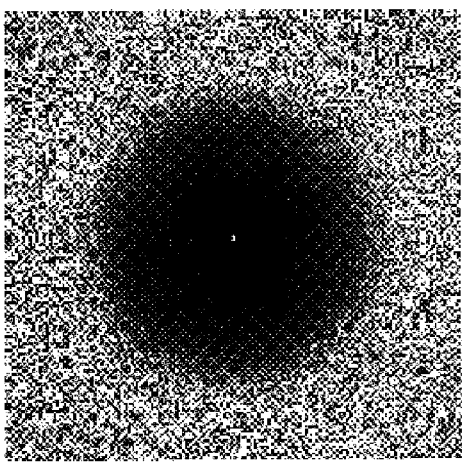
FIG. 25 is a centered composite Fourier transform (in the frequency domain) of a threshold array of a conventional stochastic screen formed by the void and cluster method.

FIG. 25 is a two-dimensional representation in the frequency domain of a three-dimensional composite Fourier magnitude image of a threshold array formed by a prior art void and cluster algorithm, in which "white" represents a high value and "black" represents a low value. The threshold array would be a conventional isolated-dot stochastic screen, and the composite Fourier transform has an origin at the center of this image 300 on FIG. 25. As described above, image 300 of the Fourier transform corresponds to the curve 204 on FIG. 16.

The image 300 on FIG. 25 illustrates a central circular region of minimal strength for lower frequencies, surrounded by a higher, random distribution at higher frequencies. Thus, lower frequency patterns are generally absent in this threshold array. Patterns at higher frequencies, including the highest frequencies near the periphery of the image 300, are present. This threshold array was generated with a weighting function having a maximum at its center, corresponding to low pixel distances or, equivalently, high pixel frequencies. Thus, these pixels have an increased chance of being selected. As the distance from the center of the weighting function increases, the pixel distance increases and the pixel frequency decreases, and these pixels have a gradually decreasing chance of being selected.

Figure 26:
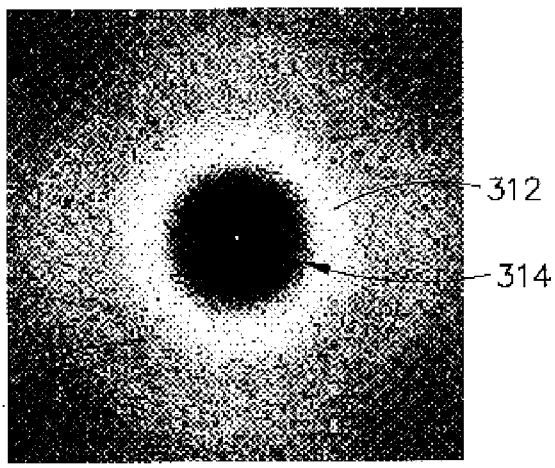
FIG. 26 is a centered composite Fourier magnitude image (in the frequency domain) corresponding to a threshold array using the difference weighting function of the present invention, using Gaussian(2)–Gaussian(1).

FIG. 26 illustrates a pattern 310, which represents in two dimensions a three-dimensional composite Fourier magnitude image corresponding to a threshold array, with the origin at the center of the image 310, in which "white" represents a high value and "black" represents a low value. In FIG. 26, the image represents a weighting function corresponding to a Gaussian distribution of two different extents, in this case Gaussian(2) minus Gaussian(1). The image on FIG. 26 corresponds to the curve 202 on FIG. 16.

As in FIG. 25, there is a central circular region of minimal strength for lower pixel frequencies. The Fourier frequency distribution reaches a peak at an intermediate frequency (within the white region 312) before decreasing toward the highest frequencies.

The corresponding weighting function has a minimum at its center area, corresponding to low pixel distances and high pixel frequencies. Thus, these pixels have a decreased chance of being selected, as evidenced by the low strength at the highest frequencies of image 310 (in FIG. 26). As the distance from the center of the weighting function increases, the weighting function reaches a maximum (or set of maxima) and then decreases again. Pixels near the maximum (or maxima) have an increased chance of being selected. This effect corresponds to the region 312. At the highest pixel distances (lowest pixel frequencies), the weighting function has a low value, corresponding to the absence of strength in region 314. At the highest pixel distances (lowest pixel frequencies), the behavior is similar to that of the void and cluster algorithm's weighting function.

Figure 27:
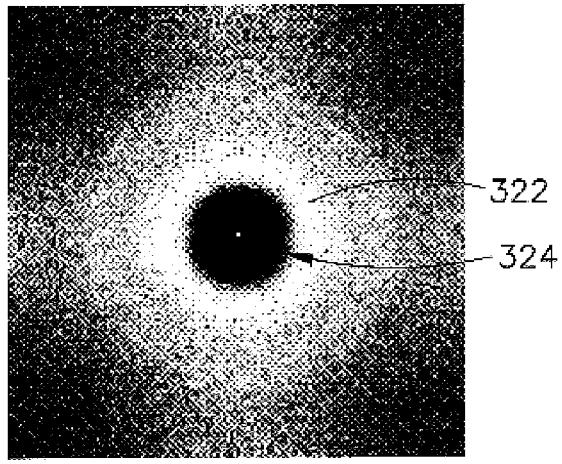
FIG. 27 is a centered composite Fourier magnitude image (in the frequency domain) corresponding to a threshold array using the difference weighting function of the present invention, using Gaussian(3)–Gaussian(1).

FIG. 27 illustrates a pattern 320 that represents in two dimensions a three-dimensional composite Fourier magnitude image corresponding to a threshold array, with the origin at the center of the image, in which "white" represents a high value and "black" represents a low value. Again, this image is in the frequency domain. In FIG. 27, the weighting function of the present invention is derived from two Gaussian functions, Gaussian(3) minus Gaussian(1), which generally corresponds to the Fourier transform curve 200 on FIG. 16.

FIG. 27 possesses the same general characteristics as FIG. 26, however, its peak region 322 is closer to the center of the image 320, occurring at a lower frequency than the peak region 312 in image 310 (of FIG. 26). This reduces the size of the central circular region that is present at the lowest pixel frequencies.

Pixels near the center of the corresponding weighting function will have a decreased chance of being selected. This corresponds to the highest (outer) frequencies of image 320 (of FIG. 27). At a certain distance away from the center, where the weighting function reaches a maximum or maxima, pixels will have an increased chance of being selected. This corresponds to the region 322. Once past this certain radial distance, the pixels will gradually have a decreasing chance of selection, again similar to the behavior of the void and cluster algorithm's weighting function. This corresponds to the lowest (central) frequencies of image 320, in the region 324.

Figure 28:
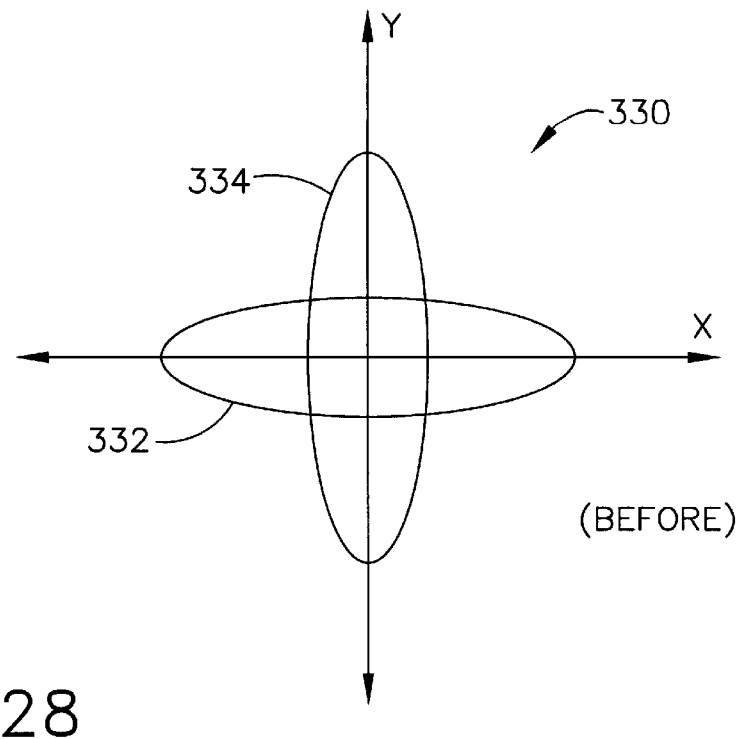
FIG. 28 shows elliptical clusters of dots that are orthogonal.

FIG. 28 illustrates a hypothetical set of clusters at 330, in which these clusters are formed by two ellipses 332 and 334. The ellipse 332 is formed along the X-axis, while the ellipse 334 is formed along the Y-axis. These clusters are formed "before" any type of rotational effects are implemented. Certain rotational effects may be desired for particular types of printing mechanisms, or perhaps to sensitize the human visual system to the image being printed. The clusters that are formed in these two ellipses 332 and 334 can be formed by different types of weighting functions according to the principles of the present invention.

Figure 29:
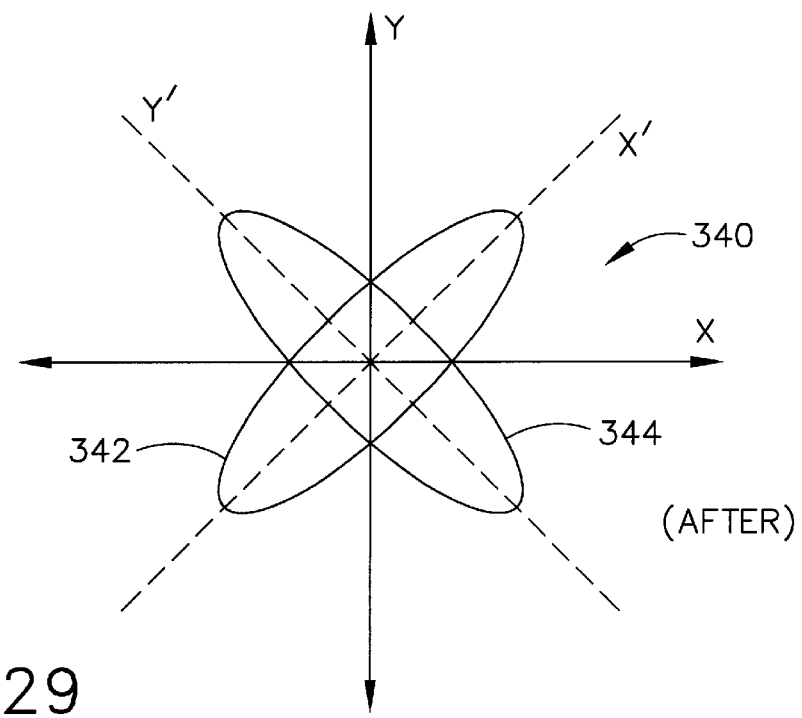
FIG. 29 illustrates a pair of elliptical clusters of dots that are rotated by 45°.

FIG. 29 shows a graph 340 that also contains two (2) ellipses, at 342 and 344. As can be easily seen, the ellipses 342 and 344 run along longitudinal axes that are at or near 45° angles from the X- and Y-axes. This type of clustering function can be implemented by rotating the results of the earlier clusters 332 and 334, after those clusters have been created. This would represent the "after" effect of the rotation as viewed in FIG. 29.

On the other hand, the 45° rotation could be accomplished at the very beginning of the algorithm that produces the elliptical clusters in the first place. In that situation, the clusters 342 and 344 would be created along each an X' and a Y' axis. These two new axes could be created by trigonometric functions at the beginning of processing, and for example, the values along the X' axis could be generated with an equation as follows:

$$X' = x \cos(45°) - y \sin(45°).$$

The Y' data could be created from the following equation:

$$Y' = x \sin(45°) + y \cos(45°).$$

The general form for a bivariate Gaussian (normal) probability distribution is shown below, as EQUATION #1. In this equation, $\mu_x$ and $\mu_y$ are the mean of x and the mean of y. The standard deviation of x and standard deviation of y are called $\sigma_x$ and $\sigma_y$. Rho ($\rho$) is a cross-correlation coefficient, having a range of −1 through +1. It will be understood that $\rho$, as a cross-correlation coefficient, is equal to $\sigma_x \sigma_y/\sigma_{xy}$.

$$\frac{\exp\left\{\frac{-1}{2(1-\rho^2)}\left[\left(\frac{x-\mu_x}{\sigma_x}\right)^2 - 2\rho\left(\frac{x-\mu_x}{\sigma_x}\right)\left(\frac{y-\mu_y}{\sigma_y}\right) + \left(\frac{y-\mu_y}{\sigma_y}\right)^2\right]\right\}}{2\pi\sigma_x\sigma_y\sqrt{(1-\rho^2)}} \quad \text{EQUATION \#1}$$

The denominator term is required so that the total area under the curve is equal to 1, which is a fundamental and necessary requirement for a probability distribution. However, since the below information is for making relative comparisons, the denominator term may be omitted in this discussion. Since x and y are assumed to be independent, the cross-correlation term $\rho=0$.

For the purposes of this discussion, the centroid $(M_x, M_y) = (0,0)$. Thus, the simplified equation becomes EQUATION #2, immediately below:

$$\exp\left\{-\frac{1}{2}\left[\left(\frac{x}{\sigma_x}\right)^2 + \left(\frac{y}{\sigma_y}\right)^2\right]\right\} \quad \text{EQUATION \#2}$$

For a circularly symmetric distribution, $\sigma = \sigma_x = \sigma_y$, so that EQUATION #2 simplifies to the following EQUATION #3:

$$\exp\left\{-\frac{1}{2}\left(\frac{x^2+y^2}{\sigma^2}\right)\right\} \quad \text{EQUATION \#3}$$

To obtain clusters of dots according to the present invention, a difference of two such functions may be used such that the standard deviation of the first function ($\sigma 1$) is larger than the standard deviation of the second function ($\sigma 2$). This gives an equation of the following form:

$$\exp\left\{-\frac{1}{2}\left(\frac{x^2+y^2}{(\sigma_1)^2}\right)\right\} - \exp\left\{-\frac{1}{2}\left(\frac{x^2+y^2}{(\sigma_2)^2}\right)\right\} \quad \text{EQUATION \#4}$$

To generate asymmetric clusters (such as those having an elliptical shape), an asymmetric weighting function may be used. One way to obtain an asymmetric weight function is to use different standard deviation values for each x and y. For example, $\sigma_{x1}$ and $\sigma_{y1}$ refer to the standard deviations for each x and y, respectively, for the first Gaussian function. In addition, $\sigma_{x2}$ and $\sigma_{y2}$ are used in the second Gaussian function.

As an example, if the standard deviation ($\sigma$) parameters have particular values, the clusters can be either wider or taller, or could be equal in size if the $\sigma_{x1}$ and $\sigma_{y1}$ values equal the $\sigma_{x2}$ and $\sigma_{y2}$ values, respectively. On the other hand, if $\sigma_{x1}=1.5$, $\sigma_{x2}=0.5$, $\sigma_{y1}=3.0$, and $\sigma_{y2}=1.0$, then the ratio for x:y is equal to 1:2. The weight function will be half as wide as it is tall. The resulting clusters will also be half as wide as they are tall.

As discussed above, other types of functions can be used instead of Gaussian probability distributions, still within the principles of the present invention. For example, a Gaussian function could be subtracted from a hyperbolic tangent function, or vice versa. Furthermore, two hyperbolic tangent functions can be subtracted from one another, as related above in reference to FIGS. 13–15. It will be understood that the hyperbolic tangent function (tan h) is equal to the form of EQUATION #5, immediately below:

$$\tanh(x) = \frac{e^x - e^{-x}}{e^x + e^{-x}} \quad \text{EQUATION \#5}$$

The values for tan h(x) fall within the range of [−1,1]; however, the range [0,1] is more useful, which may be achieved by using the equation in the following form:

(1−tan h(x))/2

The translation (shift) and slope of this function may be modified, as according to EQUATION #6, below:

$$\frac{1 - \tanh\left(\frac{x - \text{shift}}{\text{slope}}\right)}{2} \quad \text{EQUATION \#6}$$

It has been demonstrated that the simple form in which the shift and slope parameters are equal to one another provide useful results, in which k=shift=slope. As discussed above, the difference of two such functions may be used to generate clustered dots. The difference in the tan h functions can be applied to a Delta Density Sum, which relates to the minimum density variance method that was discussed above and in previous patents. The following EQUATION #7 demonstrates a form of a clustered dot forming weighting function, in which the slope and shift parameters of the first function (k1) are larger than the shift and slope parameters of the second function (k2).

$$\frac{\left\{1-\tanh\left(\frac{x-k_1}{k_1}\right)\right\}}{2} - \frac{\left\{1-\tanh\left(\frac{x-k_2}{k_2}\right)\right\}}{2} \quad \text{EQUATION \#7}$$

The first term of EQUATION #7 (i.e., the term including the "k1" factors) acts as a "minimizing" function, while the second term (i.e., the term that includes the "k2" factors) acts as a "maximizing" function. So long as the maximizing function is lower in absolute value than the minimizing function, the result of the subtraction shown in EQUATION #7 will be a positive number. When this is true, the shape of the clusters being formed will have an appearance such as that depicted in FIGS. 14 and 15, which use hyperbolic tangent functions. In the frequency domain, the shapes will be more like those depicted in FIGS. 26 and 27 (which used Gaussian functions).

On the other hand, if the maximizing function is greater in absolute value than the minimizing function, then the result of EQUATION #7 will be a negative number. Such results when using Gaussian functions are depicted in FIGS. 20–24, which were discussed above.

With regard to the minimum density variance method, EQUATION #7 can be used to generate a Delta Density Sum (DDS) array. The values (or "weight") in the DDS array can be adjusted according to the difference of the hyperbolic tangent functions. This would provide a greater efficiency than using the difference between two density sum arrays as the cost function (in the minimum density variance method).

It will be understood that, while the above weighting functions have been described as being Gaussian functions or hyperbolic tangent functions, other types of functions could easily be used without departing from the principles of the present invention. The primary criterion is that the functions being subtracted from one another have different extents when the types of functions are the same.

Various cluster characteristics can be taken into account when using the present invention. One important aspect or characteristic is the cluster size, which depends on the different type of screen frequencies that could be used. Furthermore, asymmetric clusters are possible, as discussed above. Moreover, rotated clusters are possible to produce special effects, if desired, also discussed above. Any rotation at or near 45° may be tailored for the human visual system (as discussed above).

Non-isotropic cluster distributions are possible, which also could be tailored for the human visual system. The cluster characteristics may be changed according to different gray levels, i.e., a different weighting function could be utilized for each gray level in situations where that is really desirable. For example, the darkest shades may be designed for use with larger clusters (as compared to the lighter shades).

In addition to cluster characteristics, a physical dot model may be used (as with conventional stochastic screening) that is tailored for a particular output device. The physical characteristics of the output device (typically a printer) affect the appearance of a halftoned image. The physical dots are usually circular or elliptical, rather than square or rectangular. In addition, the area of the physical dot may be larger than desired (known as dot gain) or smaller than desired (known as dot loss). The perimeter of a dot may be ragged or fuzzy, rather than crisp and precise. A given dot may also be affected by other dots that are in the proximity. These and other physical factors can influence the appearance of a halftoned image.

One or more such characteristics may be considered when designing a threshold array. For example, the dot gain (or dot loss) of a printer may be incorporated into the threshold array. The number of additional dots per gray level may be adjusted to match the response of the printer. The effect of neighboring dots may be considered by measuring and then modeling the appearance of the various combinations of the neighborhood dot patterns. The complexity of such an approach can increase rapidly as the size of the neighborhood increases, although certain redundancies (such as geometric symmetries) may be exploited to reduce the number of unique patterns. A simple neighborhood model was used in the preferred embodiment. It will be understood that other types of neighborhood models could instead be used, without departing from the principles of the present invention.

With regard to color halftoning, clustered stochastic screening may be extended to various color halftoning methodologies. One particularly useful approach involves interlocked stochastic screening. With interlocked stochastic screens, each individual color plane's screen sacrifices a small amount of quality in exchange for achieving a pleasing distribution of dots when individual screens are combined together. This can also be referred to as "jointly optimized stochastic screening."

Clustered interlocked stochastic screens may be generated, for example, using a clustered minimization/maximization (min/max) function when working with the same plane and a minimization function when working with a different plane. In other words, when adding dots to a given plane, the min/max cost function will be used for the existing dots in this same plane, whereas the minimizing cost function will be used for the dots in the other planes.

Likewise, clustered stochastic screens may be generated for other related methods of color stochastic screening, such as jointly optimized blue noise dither matrices, as proposed by Spaulding, or by Wang and Parker.

The clustered-dot methodology of the present invention may also be applied to contone (continuous tone) rendering methods. This could include laser pulse-width modulation schemes.

To provide the reader with further information on analyzing the clustered weight functions of the present invention, some examples of Mathematica™ commands to create three-dimensional plots follow, starting with a first program of commands for a Gaussian clustered weight function that is isotropic.

```
Xoutersigma = 3;
Youtersigma = 3;
Xinnersigma = 1;
Yinnersigma = 1;
xoterm = x/Xoutersigma;
yoterm = y/Youtersigma;
xiterm + x/Xinnersigma;
yiterm = y/Yinnersigma;
Ogauss = Exp [(xoterm xoterm + yoterm yoterm) / (−2)];
Igauss = Exp [(xiterm xiterm + yiterm yiterm) / (−2)];
$TextStyle = {FontFamily ->Helvetica};
g1 = Plot3D [ Ogauss − Igauss, {x,−6,6}, {y,−6,6},
    PlotPoints -> 40, Shading -> False, Boxed -> False,
    Axes -> { True, True, False}, TextStyle -> $TextStyle ];
g2 = Plot3D [ Ogauss − Igauss, {x,−6,0}, {y,0,6},
    PlotPoints -> 20, Shading -> False, Boxed -> False,
    BoxRatios -> {1,1,.75}, AxesEdge -> {Automatic, {1,−1},None} ];
Export ["g1.ps", g1,"EPS"];
Export ["g2.ps",g2,"EPS"];
```

A second listing of Mathematica commands is listed below, for creating a three-dimensional plot of a Gaussian clustered weight function that is asymmetric.

```
Xoutersigma = 1.5;
Youtersigma = 3;
Xinnersigma = 0.5;
Yinnersigma = 1;
xoterm = x/Xoutersigma;
yoterm = y/Youtersigma;
xiterm + x/Xinnersigma;
yiterm = y/Yinnersigma;
Ogauss = Exp [(xoterm xoterm + yoterm yoterm) / (−2)];
Igauss = Exp [(xiterm xiterm + yiterm yiterm) / (−2)];
$TextStyle = {FontFamily ->Helvetica};
g1 = Plot3D [ Ogauss − Igauss, {x,−6,6}, {y, ,−6,6},
    PlotPoints -> 40, Shading -> False, Boxed -> False,
    Axes -> {True, True, False}, TextStyle -> $TextStyle ];
g2 = Plot3D [ Ogauss − Igauss, {x,−6,0}, {y,0,6},
    PlotPoints -> 20, Shading -> False, Boxed -> False,
    PlotLabel -> StyleForm [Columnform [{
       "\!\`(e\(−\(1\/2\) ( (x\/ \[Sigma]\_xouter)\^2 +
                       (y\/ \[Sigma]\_youter)\^2) ) −\)",
       "\!\(e\`(−\(1\/2\) ( (x\/\[Sigma]\_xinner)\^2 +
                       (y\/\[Sigma]\_yinner)\^2) ) \)"}, Center]
    // TraditionalForm, FontSize −>20],
    BoxRatios->{1,1,.75}, AxesEdge->{Automatic,{1,−1},None} ];
Export ["g3.ps",g1,"EPS"];
Export ["g4.ps",g2,"EPS"];
```

A further example of Mathematica commands to create a three-dimensional plot is provided below, this time it is for a non-isotropic Gaussian clustered weight function.

```
Xoutersigma = 4;        (* asymmetric minimization *)
Youtersigma = 1;
Xinnersigma = 0.5;      (* isotropic maximization *)
Yinnersigma = 0.5;
angle = Pi / 4;         (* 45 degree rotation *)
xxOterm = (x Cos[angle] − y Sin[angle]) / Xoutersigma;
yyOterm = (x Sin[angle] + y Cos[angle]) / Youtersigma;
xyOterm = (x Cos[angle] − y Sin[angle]) / Youtersigma;
yxOterm = (x Sin[angle] + y Cos[angle]) / Xoutersigma;
```

-continued

```
xxIterm = (x Cos[angle] – y Sin[angle]) / Xinnersigma;
yyIterm = (x Sin[angle] + y Cos[angle]) / Yinnersigma;
xyIterm = (x Cos[angle] – y Sin[angle]) / Yinnersigma;
yxIterm = (x Sin[angle] + y Cos[angle]) / Xinnersigma;
Ogauss = Exp [(xxOterm xxOterm + yyOterm yyOterm) / (–2)] +
    Exp [(xyOterm xyOterm + yxOterm yxOterm) / (–2)];
Igauss = Exp [(xxIterm xxIterm + yyIterm yyIterm) / (–2)] +
    Exp [(xyIterm xyIterm +yxIterm yxIterm) / (–2)];
$TextStyle={FontFamily->Helvetica};
g1 = Plot3D [ Ogauss–Igauss, {x,–6,6}, {y,–6,6},
    PlotPoints->40, Shading->False, Boxed->False,
    Axes->{True,True,False}, TextStyle->$TextStyle];
g2 = Plot3D [ Ogauss–Igauss, {x,–6,0}, {y,0,6},
    PlotPoints->20, Shading->False, Boxed->False,
    BoxRatios->{1,1,.75}, AxesEdge->{Automatic,{1,–1 },None},
    TextStyle->$TextStyle ];
Export ["g5.ps",g1,"EPS"];
Export ["g6.ps",g2,"EPS"];
```

Finally, a listing of Mathematica commands to create a three-dimensional plot of a hyperbolic tangent clustered weight function follows below.

```
outerparam = 1.5;
innerparam = outerparam 2 / 3;
r = Sqrt [x x + y y];
outerterm = (r – outerparam) / outerparam;
innerterm = (r – innerparam) / innerparam;
Otanh = (1 – Tanh[ outerterm ]) / 2;
Itanh = (1 – Tanh[ innerterm ]) / 2;
t1 = Plot3D [   Otanh–Itanh, {x,–6,6}, {y,–6,6},PlotPoints->40,
                Shading->False, Boxed->False,
                Axes->{True,True,False}, TextStyle->$TextStyle];
t2 = Plot3D [   Otanh–Itanh, {x,–6,0}, {y,0,6},PlotPoints->20,
                Shading->False, Boxed->False,
                BoxRatios->{1,1,.75}, AxesEdge->{Automatic,
                {1,–1},None},
                TextStyle->$TextStyle];
Export ["t1.ps",t1,"EPS"];
Export ["t2.ps",t2,"EPS"];
```

It will be understood that logical and mathematical operations described in connection with the present invention can be accomplished using sequential logic, such as by using microprocessor technology, or by using a logic state machine, or perhaps by other discrete logic; it even could be implemented using parallel processors. In the case of using a microprocessor, software instructions that are stored in memory cells of a memory circuit (e.g., RAM or ROM) are executed to implement the methodologies described above. Such memory circuits can consist of virtually any type of technology available today (or available in the future), including semiconductor, magnetic, or optical memory devices, all without departing from the principles of the present invention.

It will be further understood that the precise logical or mathematical operations described above could be somewhat modified to perform similar, although not exact, functions without departing from the principles of the present invention. The exact nature of the weighting functions (and image handling steps and other commands) are directed toward at least one of the preferred embodiments of the present invention and certainly similar, but somewhat different, functions or steps could be taken for use with specific types of printing systems in many instances, with the overall inventive results being the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for halftoning for use in an image forming system having a computer system, said method comprising:
   (a) providing a first function of a first extent and a second function of a second extent, wherein said first extent is not equal to said second extent, and subtracting said second function from said first function to thereby derive a weighting function; and
   (b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
   wherein said weighting function: (1) causes locations very close to an existing dot to have an increased chance of being selected: then (2) where said weighting function increases to said at least one maximum, causes such locations to have a smaller chance of being selected; and (3) as said weighting function decreases toward said at least one second minima, causes such locations to have a gradually increasing chance of selection.

2. The method as recited in claim 1, wherein locations proximal to said at least one maximum are located at a predetermined distance, or a predetermined range of distances, from said substantially center position.

3. The method as recited in claim 1,
   wherein said first and second functions comprise two different types of mathematical functions.

4. The method as recited in claim 1,
   wherein said weighting function is non-isotropic.

5. The method as recited in claim 2,
   wherein said weighting function is asymmetric.

6. The method as recited in claim 5, wherein said weighting function is rotated about at least one axis.

7. A method for halftoning for use in an image forming system having a computer system, said method comprising:
   (a) providing a first function of a first extent and a second function of a second extent, wherein said first extent is not equal to said second extent, and subtracting said second function from said first function to thereby derive a weighting function; and
   (b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
   wherein said first and second functions each comprise a hyperbolic tangent function of a form:

$$1 = \tan h((x = \text{shift})/\text{slope}),$$

such that each of said first and second hyperbolic tangent functions have a different shift and slope numeric value, to arrive at different said first and second extents.

8. A method for halftoning for use in an image forming system having a computer system, said method comprising:
(a) providing a first function of a first extent and a second function of a second extent, wherein said first extent is not equal to said second extent, and subtracting said second function from said first function to thereby derive a weighting function; and
(b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
wherein said weighting function is filtered to produce said at least one dot cluster that is substantially elliptical in appearance about an axis that is not orthogonal to said input data.

9. A method for halftoning for use in an image forming system having a computer system, said method comprising:
(a) providing a first function of a first extent and a second function of a second extent, wherein said first extent is not equal to said second extent, and subtracting said second function from said first function to thereby derive a weighting function; and
(b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path; and
(c) creating a threshold array utilizing said weighting function;
wherein a size of said at least one dot cluster is adjusted by controlling a screen frequency of said threshold array.

10. A method for halftoning for use in an image forming system having a computer system, said method comprising:
(a) providing a first function of a first extent and a second function of a second extent, wherein said first extent is not equal to said second extent, and subtracting said second function from said first function to thereby derive a weighting function;
(b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
(c) creating a threshold array utilizing said weighting function; and
(d) interlocking more than one threshold array with respect to another.

11. A method for halftoning for use in an image forming system having a computer system, said method comprising:
(a) providing a first function of a first extent and a second function of a second extent, wherein said first extent is not equal to said second extent, and subtracting said second function from said first function to thereby derive a weighting function;
(b) halftoning input data using said weighting function to create at least one dot cluster, wherein, at each said dot cluster, said weighting function reaches at least one first minima at substantially a center position, then increases to at least one maximum along a pat directed away from said center position, and finally decreases toward at least one second minima further along said path;
(c) creating a threshold array utilizing said weighting function; and
(d) providing a physical dot model in addition to threshold array screening that is tailored for use with a particular output device.

12. A method for halftoning for use in an image forming system having a computer system, said method comprising:
(a) providing a first function of a first extent and a second function of a second extent, wherein said first extent is not equal to said second extent, and subtracting said second function from said first function to thereby derive a weighting function;
(b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path; and
(c) creating a threshold array utilizing said weighting function;
wherein said threshold array comprises a stochastic threshold array derived by a minimum density variance methodology.

13. The method as recited in claim 12, wherein stochastic threshold array uses a cost function such that, a result of said second function subtracted from said first function is substantially equivalent to a difference between two density sum arrays.

14. The method as recited in claim 12, wherein stochastic threshold array uses a cost function such that, a result of said second function subtracted from said first function is substantially equivalent to a difference between two delta density sum rays.

15. A method for halftoning for use in an image forming system having a computer system, said method comprising:
(a) providing a first minimization function and a second maximization function, wherein said first and second functions are not equal to one another, and subtracting said second function from said first function to thereby derive a weighting function; and
(b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
wherein said weighting function: (1) causes locations very close to an existing dot to have an increased chance of being selected; then (2) where said weighting function increases to said at least one maximum, causes such locations to have a smaller chance of being selected; and (3) as said weighting function decreases toward said at least one second minima, causes such locations to have a gradually increasing chance of selection.

16. The method as recited in claim 15, wherein locations proximal to said at least one maximum are located at a predetermined distance, or a predetermined range of distances, from said substantially center position.

17. The method as recited in claim 15,
wherein said weighting function is non-isotropic.

18. The method as recited in claim 15, wherein said weighting function is asymmetric.

19. The method as recited in claim 18, wherein said weighting function is rotated about at least one axis.

20. A method for halftoning for use in an image forming system having a computer system, said method comprising:
   (a) providing a first minimization function and a second maximization function, wherein said first and second functions are not equal to one another, and subtracting said second function from said first function to thereby derive a weighting function; and
   (b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
   wherein said first and second functions each comprise a hyperbolic tangent function of a form:

$$1-\tan h(\,(x-\text{shift})/\text{slope});$$

such that each of said first and second hyperbolic tangent functions have a different shift and slope numeric value, to arrive at different said first and second extents.

21. A method for halftoning for use in an image forming system having a computer system, said method comprising:
   (a) providing a first minimization function and a second maximization function, wherein said first and second functions are not equal to one another, and subtracting said second function from said first function to thereby derive a weighting function;
   (b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path;
   (c) creating a threshold array utilizing said weighting function; and
   (d) interlocking more than one threshold array with respect to another.

22. A method for halftoning for use in an image forming system having a computer system, said method comprising:
   (a) providing a first minimization function and a second maximization function, wherein said first and second functions are not equal to one another, and subtracting said second function from said first function to thereby derive a weighting function;
   (b) halftoning input data using said weighting function to create at least one dot cluster, wherein, at each said dot cluster, said weighting function reaches at least one first minima at substantially a center position, then increases to at least one maximum along a path directed away from said center position, and finally decreases toward at least one second minima further along said path; and
   (c) creating a threshold array utilizing said weighting function;
   wherein said threshold array comprises a stochastic threshold array derived by a minimum density variance methodology.

* * * * *